US009105026B1

(12) United States Patent
Edwards

(10) Patent No.: US 9,105,026 B1
(45) Date of Patent: Aug. 11, 2015

(54) ROLLING INTERFACE TRANSITION FOR MOBILE DISPLAY

(71) Applicant: Square, Inc., San Francisco, CA (US)

(72) Inventor: Troy J. Edwards, Los Gatos, CA (US)

(73) Assignee: Square, Inc., San Francisco, CA (US)

( * ) Notice: Subject to any disclaimer, the term of this patent is extended or adjusted under 35 U.S.C. 154(b) by 54 days.

(21) Appl. No.: 14/042,525

(22) Filed: Sep. 30, 2013

(51) Int. Cl.
*G06Q 40/00* (2012.01)
*G06Q 20/40* (2012.01)

(52) U.S. Cl.
CPC ..................................... *G06Q 20/40* (2013.01)

(58) Field of Classification Search
CPC .................. G06F 2206/1008; G06F 17/30126; G06F 3/04815; G06F 17/21
See application file for complete search history.

(56) References Cited

U.S. PATENT DOCUMENTS

| 2004/0102244 A1* | 5/2004 | Kryuchkov et al. | 463/32 |
| 2010/0081475 A1* | 4/2010 | Chiang et al. | 455/564 |
| 2012/0154293 A1* | 6/2012 | Hinckley et al. | 345/173 |
| 2012/0256959 A1* | 10/2012 | Ye et al. | 345/649 |
| 2012/0260218 A1* | 10/2012 | Bawel | 715/841 |
| 2013/0226800 A1* | 8/2013 | Patel et al. | 705/44 |
| 2014/0075286 A1* | 3/2014 | Harada | 715/234 |

OTHER PUBLICATIONS

Stephen D. Evans, Rotate in tkinter, Dec. 6, 2000, grokbase.com.*

* cited by examiner

*Primary Examiner* — Scott S Trotter
(74) *Attorney, Agent, or Firm* — Perkins Coie LLP

(57) ABSTRACT

A method of implementing a rolling interface transition on a mobile device is disclosed. The method in one embodiment includes generating a first interface instance and a second interface instance on the mobile device; displaying the first interface instance on a display screen of the mobile device; detecting a motion of the mobile device through a sensor mechanically coupled to the mobile device; and rendering an interface transition visual effect such that the second interface instance replaces the first interface instance in an area of the display screen, and the area increases according to a progression of the motion.

26 Claims, 18 Drawing Sheets

ROLLING INTERFACE TRANSITION FOR MOBILE DISPLAY

BACKGROUND

Mobile devices such as smartphones and tablet computers ("tablets") are versatile machines that have greatly expanded practical usages of computing devices. Among other benefits, a mobile device can be conveniently used by multiple users, such as by one user simply handing the mobile device to another user or by flipping the mobile device mounted on a rotatable docking station towards another user. One application in which this may occur, for example, is the use of a mobile device to facilitate a financial transaction between a merchant and a consumer, where the mobile device has to interact with both the merchant and the consumer during the financial transaction.

In a manner similar to a conventional checkout register, a mobile register software application running on a mobile device enables a merchant to check out purchases made by a consumer. The mobile register application can include a merchant interface instance to enable the merchant to review items or services that a consumer would like to purchase. The mobile register application can also include a device interface to communicate with a payment card reader, where the payment card reader is coupled to the mobile device via a dongle, a wired connection, or a wireless connection. The mobile register application can further include a consumer interface instance for enabling the consumer to sign and/or enter a personal identification number (PIN) on the mobile device to verify a payment card accessed via the payment card reader. In this way, the mobile register application implemented on the mobile device can substitute for a traditional set of devices including a checkout register, a card reader, a PIN keypad, and a signature capture device. An example of a mobile register application with functionality such as the Square Register, available from Square, Inc. of San Francisco, Calif.

Figure 1A:
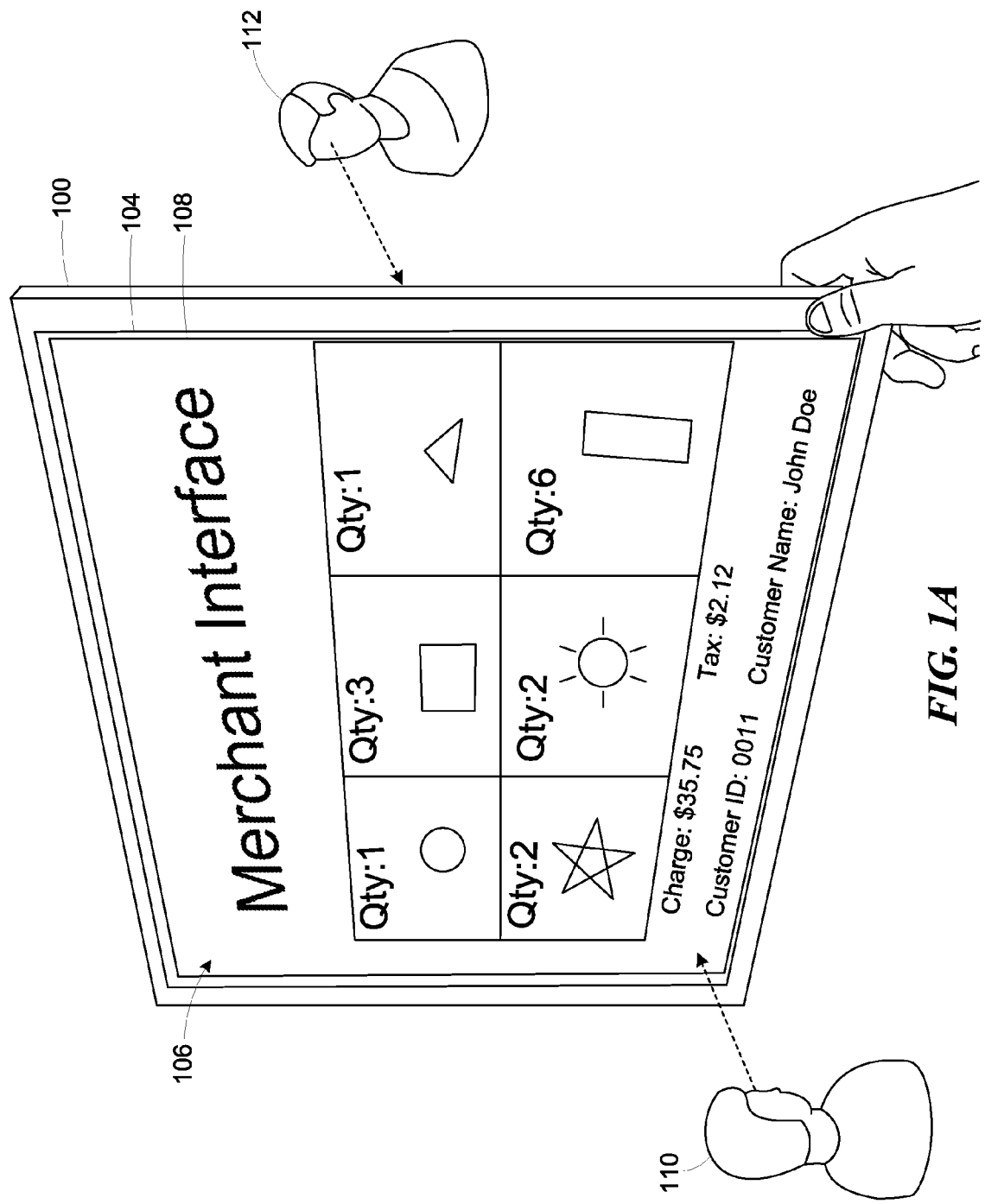
FIGS. 1A-1C illustrate a first embodiment of a rolling interface transition technique for user interfaces implemented on a mobile device from a first perspective view.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Introduced herein is a technique to smoothly transition between multiple user interface instances on a mobile device based on a rotational motion of the mobile, to provide an improved user experience for multiple users (i.e., two or more) when sharing a mobile device. The rotational motion can be, particularly, a rolling rotation of the mobile device where the mobile device rotates on an axis parallel to an edge of a display screen. The transition between the two user interface instance is a continuous "rolling" transition, where a first interface instance is gradually phased out of a display screen as a second interface instance is introduced onto the display screen to replace an area previously occupied by the first interface instance. The animated motion of phasing in and out may be coupled (i.e., synchronized in direction and speed) to the rotational motion. That is, rotation in one direction about a particular axis causes the first interface instance to phase out and the second interface instance to phase in, and rotation in the opposite direction about the particular axis causes the second interface instance to phase out and the first interface instance to phase in. The rotational motion may be detected by one or more sensors of the mobile device, such as an accelerometer, a compass, a gyroscope, an orientation sensor, or any combination thereof. The rotational motion may also be detected by a sensor outside the mobile device. For example, a rotary sensor in a docking stand for the mobile device can detect rotational motion of the mobile device, and feed the rotational motion information back to the mobile device via a wire or wireless.

The rotational motion that triggers the interface transition can be a motion that rotates the mobile device over from a first user to a second user (i.e., around an axis parallel to a top or bottom edge of a display screen of the mobile device). The rotational motion that triggers the interface transition can also be a motion that spins the mobile device around from the first user to the second user (i.e., around an axis parallel to a left or right edge of the display screen). For example, where the rotational motion spins the mobile device around the first user to the second user, a compass (in the mobile device or on the docking station of the mobile device) may be used to track a progression of the rotational motion.

Compact implementation of a mobile register application on a mobile device are sometimes shadowed by inconveniences when the mobile device is transitioning between its various modes, such as a merchant-facing instance of the mobile register interface and a consumer-facing instance of the mobile register interface. For example, a merchant has to ensure that the mobile register application transitions to the consumer-facing interface prior to handing or flipping the mobile device over or towards to a consumer, so that the consumer does not become confused or annoyed. The inconvenience is sometimes exacerbated by a display auto-rotate mechanism implemented on many mobile devices. The auto-rotate mechanism rotates an interface displayed on the mobile device in 90 degrees steps, to ensure that the bottom of the interface aligns with the "bottom" of the mobile device according to how the device is oriented at any given moment. Any sudden 180 degree rotation, such as when the mobile device is flipped from facing one user to another, would cause the auto-rotate mechanism to be rotate around an axis pointing out of the display instead of the natural "rolling" rotation (i.e., a rotation around an axis parallel to an edge of the display) that reflects the actual motion of the flipping handover. Hence, when the mobile device is flipped towards the consumer to enable the consumer to review or input information, the auto-rotate mechanism, if enabled, rotates the interface in a motion contrary to the physical rotation and thus may at least temporarily confuse or annoy the consumer.

The disclosed technique allows automatic transition between user interface instances based on a rotational movement using the entire mobile device around an axis that is parallel to an edge of the mobile device. When a person hands over a mobile device or spins the mobile device around to another person, the person may rotate the mobile device in an arch shaped path towards the other person. This is particularly common in the context of the mobile register application where a merchant flips (e.g., by hand or with assistance of a rotatable docking station) the mobile device towards a consumer to ask the consumer to review and authorize a transaction. With this in mind, the rolling transition provided by the technique introduced here is "automatic" in the sense that initialization of the interface transition requires no additional input from a user when one user is handing or flipping the mobile device over to another user.

The disclosed technique provides a smooth and intuitive transition from one user interface to another. Because the rolling transition is responsive to the rotational motion in real-time, a user who suddenly changes his mind in the middle of a rotational gesture would be able to smoothly return to the first interface instance from the second interface instance without suffering through a canned animation sequence (common to conventional user interface transitions) that contradicts the actual orientation or movement of the device.

The disclosed technique is useful in applications where more than one user is required to interact with the mobile device to complete a process. For example, a mobile register application on a mobile device with a touchscreen, emulating a cash register at a merchant store, calls for interaction with at least a merchant and a consumer. The disclosed technique eliminates the step of having to manually activate an interface transition on a merchant interface instance of the mobile register application when the merchant, after he/she verified and processed a financial transaction, would like to hand over the mobile device to the consumer to enter personal information (e.g., signature, PIN or zip code) on a consumer interface instance to authorize the financial transaction. The disclosed technique couples a rotational motion, common when a merchant hands over the mobile device to a consumer, to a transition animation in real-time, such that quick interface transitions back and forth between the merchant and consumer interface instances would not result in a queuing of canned animations.

In various embodiments, the second interface instance is transitioned into visibility from an opposite orientation from that of the first interface instance. That is, the top of the first interface instance touches the top of the second interface instance. In at least one embodiment, the second interface instance is a new instance or session of the first interface instance, visually identical to the first interface instance aside from its orientation. In some embodiments, the rolling transition occurs only when a rotational motion of the mobile device includes rotating a display screen of the mobile device to face away from the ground (i.e., away from a direction of the gravitational pull) and then back down to face a direction opposite to the user originally holding the mobile device.

In some embodiments, the disclosed technique involves coupling the rotational motion to panning of a view window on the display screen from the first interface instance to the second interface instance. The view window pans by shifting the first interface instance out of a first edge of the view window and shifting the second interface instance into the view window from a second edge opposite to the first edge. The speed and direction of the panning may be coupled directly to the speed and direction of the rotational motion.

In some embodiments, the disclosed technique involves coupling the rotational motion to contraction in height of the first interface instance from a view window of the display screen and expansion in height of the second interface instance from the view window. The speeds of the contraction and expansion may be coupled such that any freed up space in the view window from the contraction is taken up by the expansion. The speeds of the contraction and expansion may further be coupled to the speed of the rotational motion. When the direction of the rotational motion reverses, then objects of the contraction and expansion exchanges. That is, when the rotational motion reverses, the first interface instance begins to expand and the second interface instance begins to contract.

In some embodiments, the disclosed technique involves mapping the first interface instance and the second interface instance onto equal and opposite sides of a virtual curved sheet surface. The virtual curved sheet surface is a virtual sheet surface curving in one direction and straight in another. A view window of the display screen may serve as a camera frame observing the virtual curved sheet surface. As the view window pans across the virtual curved sheet surface in a three-dimensional environment, a portion of the visual texture on the virtual curved sheet surface is displayed on the display screen as observed through the view window. The panning movement of the view window may be coupled to the rotational motion, such that the view window pans at a constant distance over the virtual curved sheet surface along a curvature of the virtual curved sheet surface.

In some embodiments, the disclosed technique involves coupling the rotational motion with panning of a view window on the display screen at a constant distance from a virtual curved sheet surface and along its curvature, such as described above, and with an adjustment to the curvature. For example, while panning, the curvature increases until a bisecting line of the view window intersects with a bisecting plane of the virtual curved sheet surface and decreases thereafter.

Figure 1B:
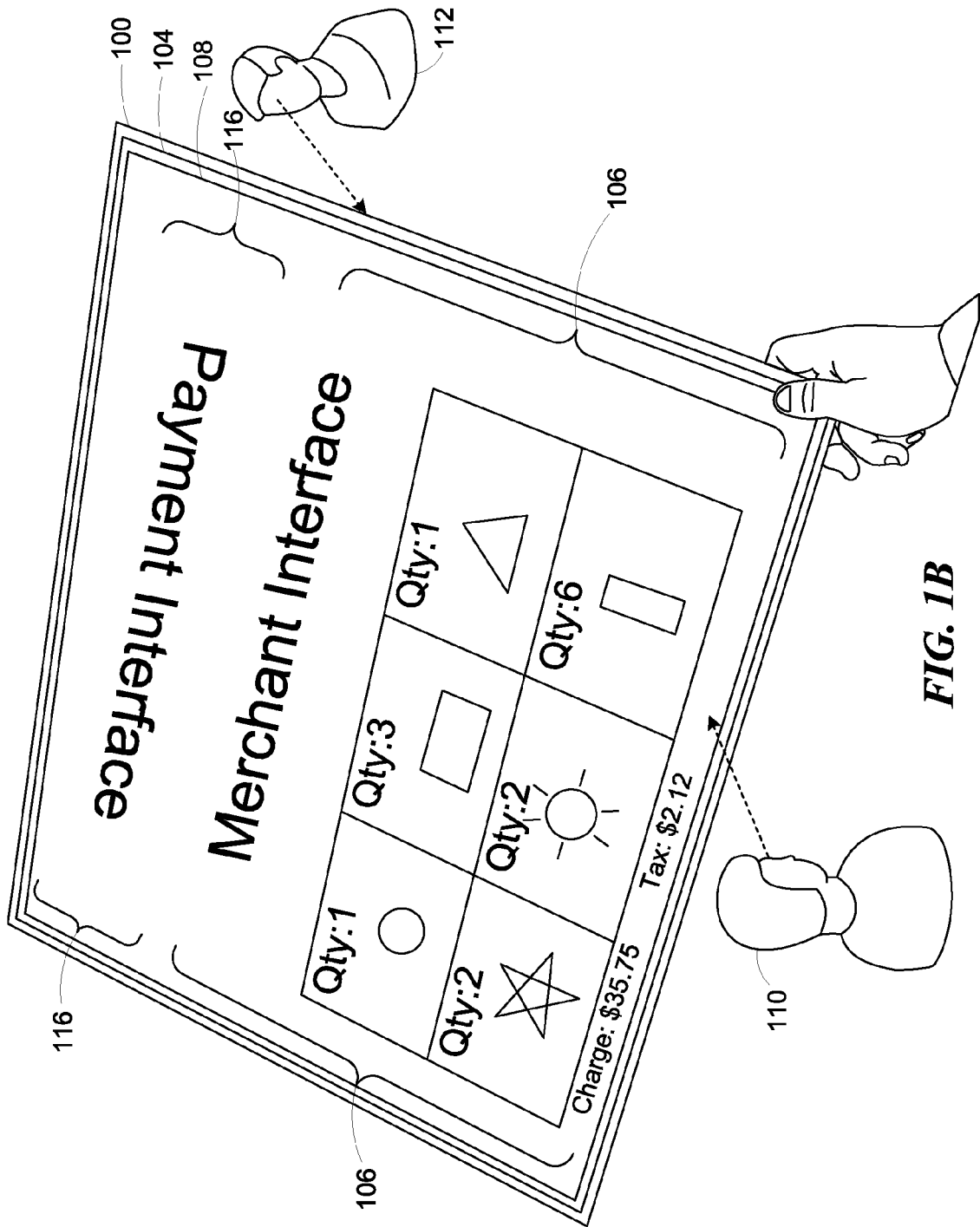
Figure 1C:
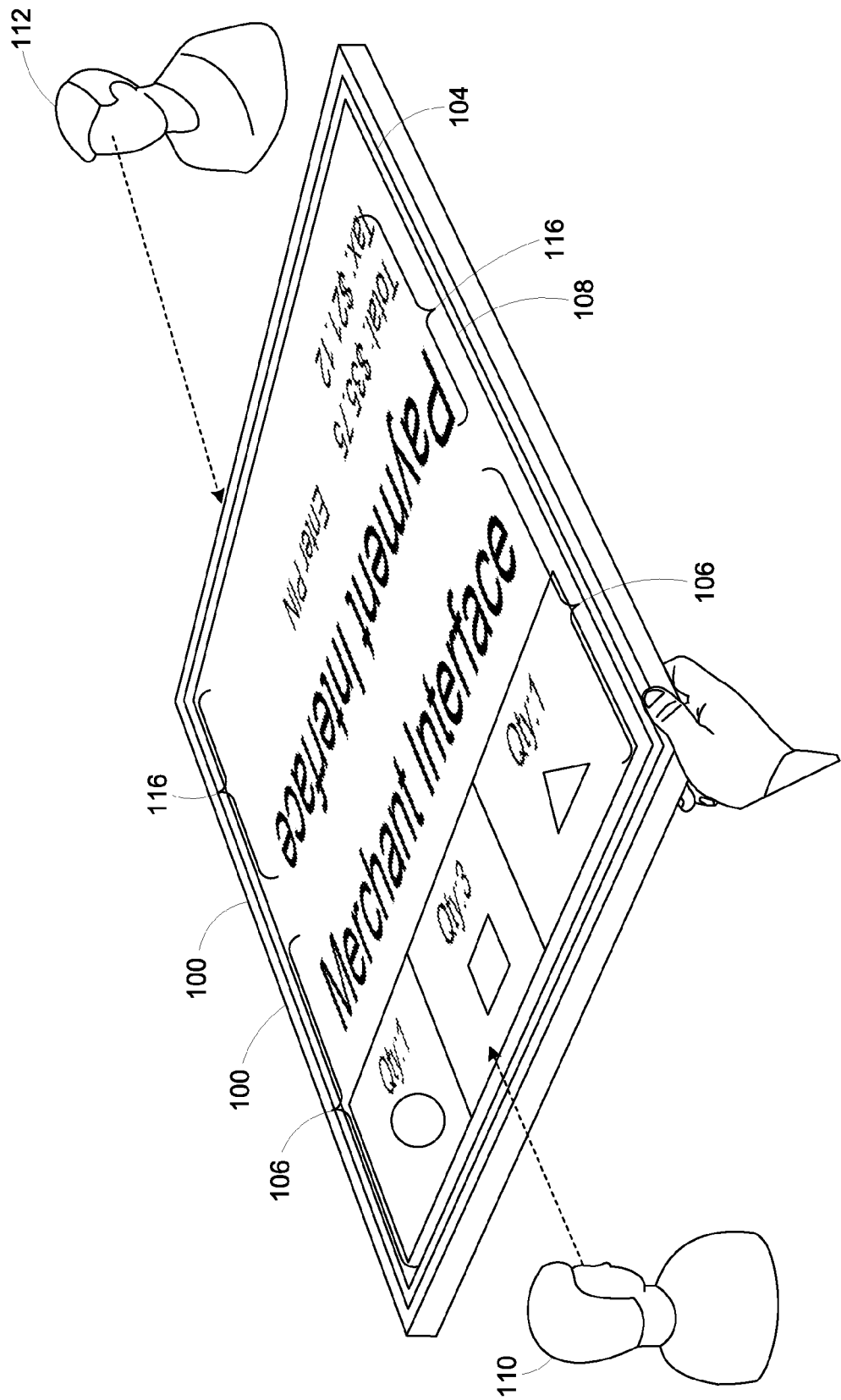

FIGS. 1A-1C illustrate a first embodiment of a rolling interface transition technique for user interfaces implemented on a mobile device 100 from a first perspective view. The mobile device 100 can be a general purpose device with data processing capabilities. For example, the mobile device 100 can be a mobile phone, a tablet, an e-reader, or other mobile or portable computing devices. The mobile device 100 can include a display screen 104, such as a liquid crystal display (LCD) or an organic light emitting diode display (OLED). The display screen 104 can be part of a touchscreen.

The mobile device 100 can implement an application, such as a mobile register application, where the application includes a merchant interface instance 106. The merchant interface instance 106 is an instance of a user interface intended for a merchant (e.g., an interface to process and checkout item/services purchased) displayed on a view window 108 of the display screen 104. As shown, the view window 108 takes up nearly the entirety of the display screen 104. However, it is noted that the view window 108 may take up the entirety or any portion of the display screen 104.

The first perspective view is shown from the same side as a merchant user 110. As shown in the sequence of illustrations in FIGS. 1A-1F, the merchant user 110 can rotate the mobile device 100 in a rotational motion, first pointing the display screen 104 face up, and then towards a consumer user 112. The rotational motion is coupled to an interface transition animation. The interface transition animation is a real-time and dynamic visual effect. The mobile device 100 can store a set trajectory of how the rotational motion is expected progress. When the mobile device 100 is positioned at each end of the set trajectory, only one of the user interfaces (e.g., the merchant interface instance 106 or the consumer interface instance 116) would be displayed in the view window 108. Size of the view window 108 can remain constant throughout the interface transition animation.

In this embodiment, the interface transition animation includes shifting in a portion of a consumer interface instance 116 while shifting out a portion of the merchant interface instance 106. The shifting movement can be controlled according to a rotary progression of the rotational motion, where the amount shifted is proportional to how much the mobile device has progressed in the set trajectory of the rotational motion. For example, the portion of the consumer interface instance 116 can be shifted in from a top edge of the view window 108 and the portion of the merchant interface instance 106 can be shifted out from a bottom edge of the view window 108. Alternatively, this interface transition may be accomplished in an opposite manner from the above example, or with left and right edges of the view window 108.

In FIG. 1A, the merchant interface instance 106 takes up the entirety of the view window 108. The merchant user 110 or a physical structure can be holding the mobile device 100 nearly upright such that the display screen 104 is substantially orthogonal to the ground. In other embodiments, the interface transition may initiate from any angle with respect to the ground (e.g., 45 degrees). In FIG. 1B, the mobile device 100 has been rotated by the merchant user 110 by approximately a 45° angle. As part of the interface transition animation, the merchant interface instance 106 now occupies only approximately three fourth of the view window 108 with a portion of the merchant interface instance 106 shifted out from the bottom edge of the view window 108. Where the merchant interface instance 106 has shifted out, a portion of the consumer interface instance 116 can shift into view on the view window 108. In FIG. 1C, the mobile device 100 has further been rotated by the merchant user 110 by approximately a 45° angle from the orientation of FIG. 1B. As part of the interface transition animation including the shifting-in and shifting-out mechanisms, the merchant interface instance 106 now occupies half of the view window 108 as shown, where the consumer interface instance 116 occupies the other half.

Figure 1D:
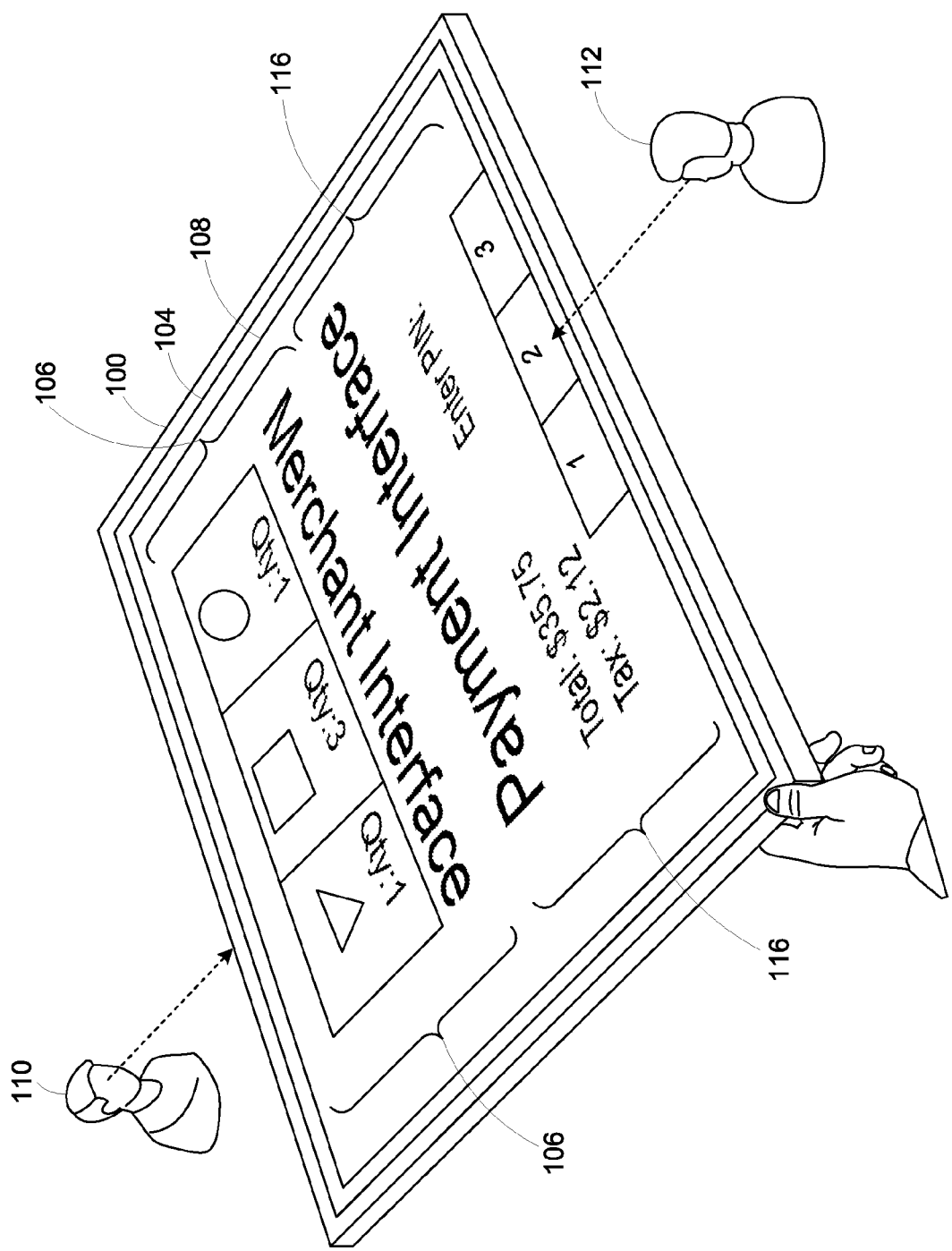
FIGS. 1D-1F illustrate the first embodiment of the rolling interface transition technique for the user interfaces implemented on the mobile device from a second perspective view.
Figure 1E:
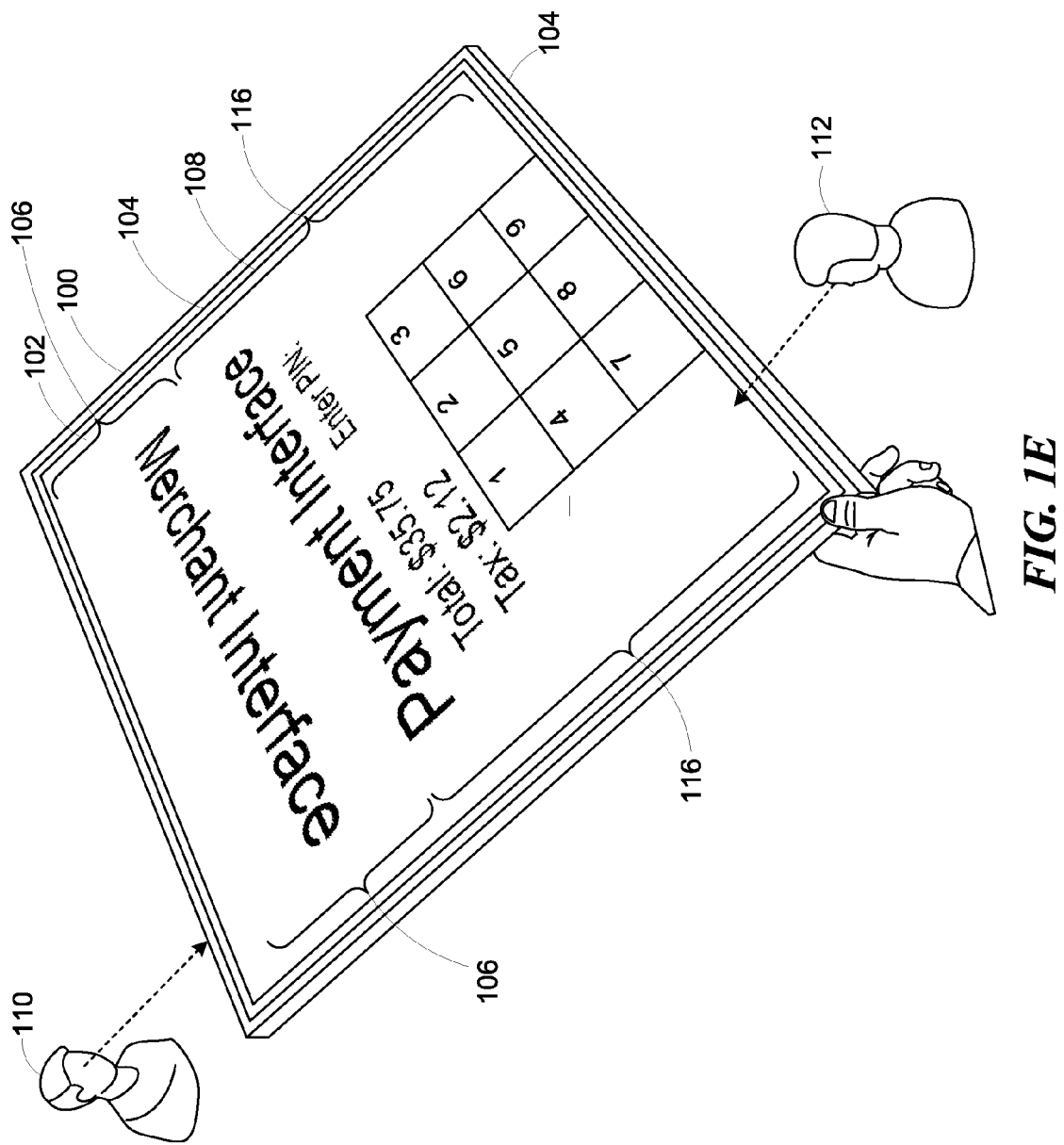
Figure 1F:
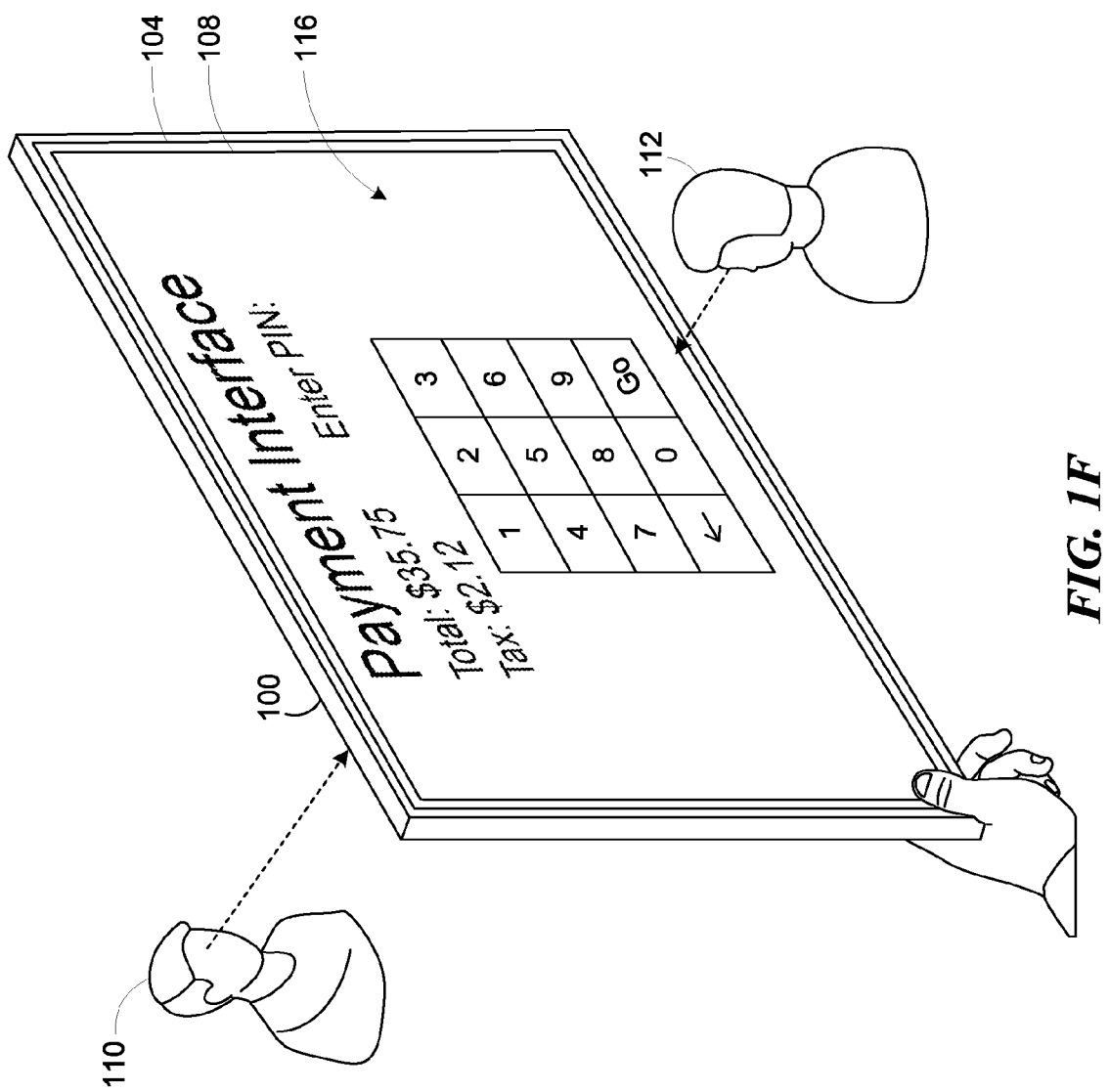

FIGS. 1D-1F illustrate the first embodiment of the rolling interface transition technique for the user interfaces implemented on the mobile device 100 from a second perspective view. The second perspective view is shown from the same side as the consumer user 112. The second perspective view can be from a direction opposite of the first perspective view. FIGS. 1D-1F continues to illustrate an example trajectory of the rotational motion of the mobile device 100.

FIG. 1D can represent the same state of the interface transition animation on the display screen 104 as in FIG. 1C, except shown from the second perspective view. A top half portion of the consumer interface instance 116 takes up half of the view window 108 while a top half portion of the merchant interface instance 106 takes up the other half of the view window 108. In FIG. 1E, the mobile device 100 is further rotated by approximately a 45° angle from an orientation of the mobile device 100 in FIG. 1D. As part of the interface transition animation, an additional portion of the consumer interface instance 116 is shifted into view, and portions of the consumer interface instance 116 now takes up three fourth of the view window 108. Another portion of the merchant interface instance 106 has been shifted out of view, with remaining portion of the merchant interface instance 106 occupying the remaining space on the view window 108. In FIG. 1F, the mobile device 100 completes the set trajectory of the rotational motion. The interface transition animation terminates with the consumer interface instance 116 taking up the entirety of the view window 108.

Figure 2A:
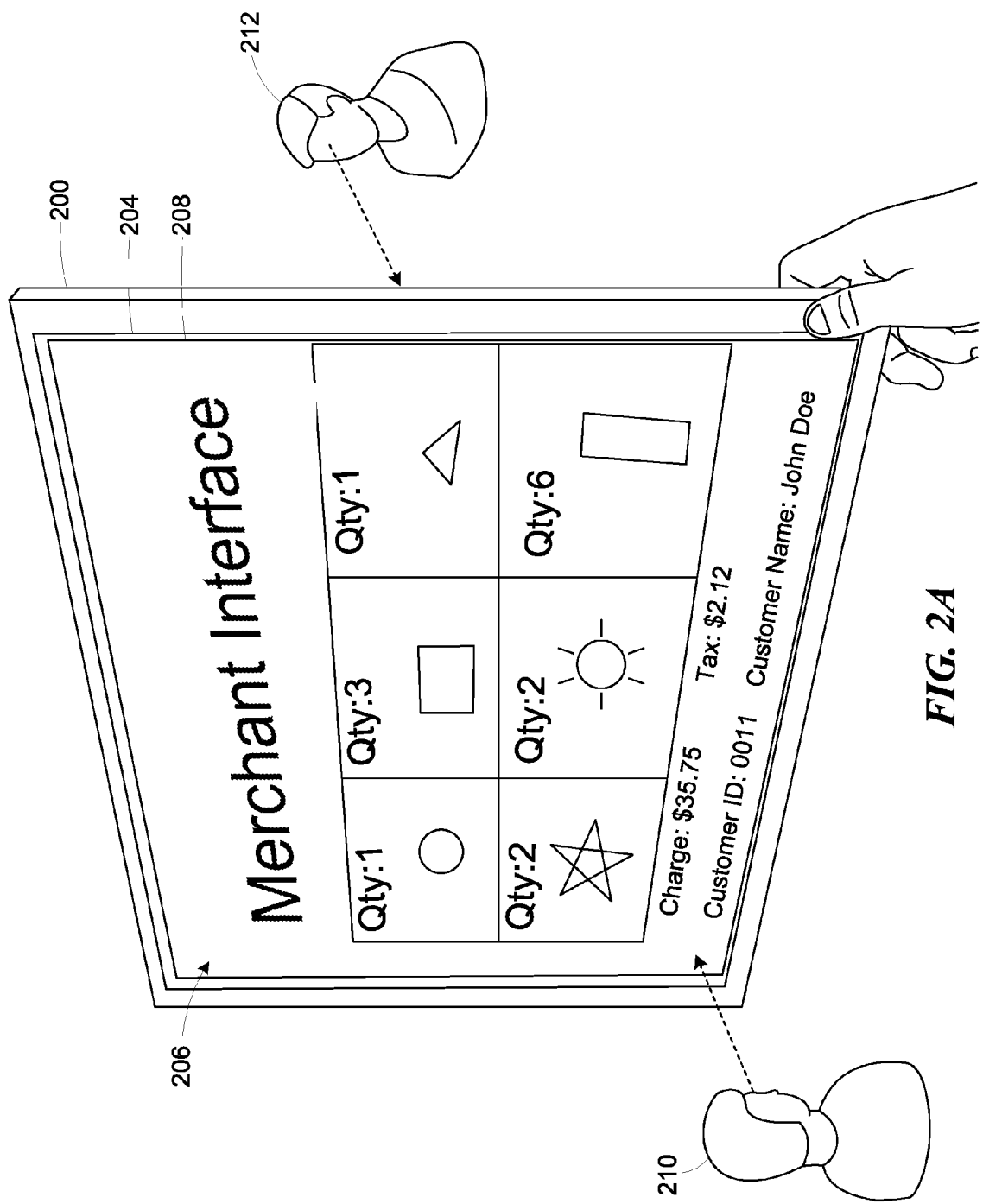
FIGS. 2A-2C illustrate a second embodiment of a rolling interface transition technique for user interfaces implemented on a mobile device from a first perspective view.
Figure 2B:
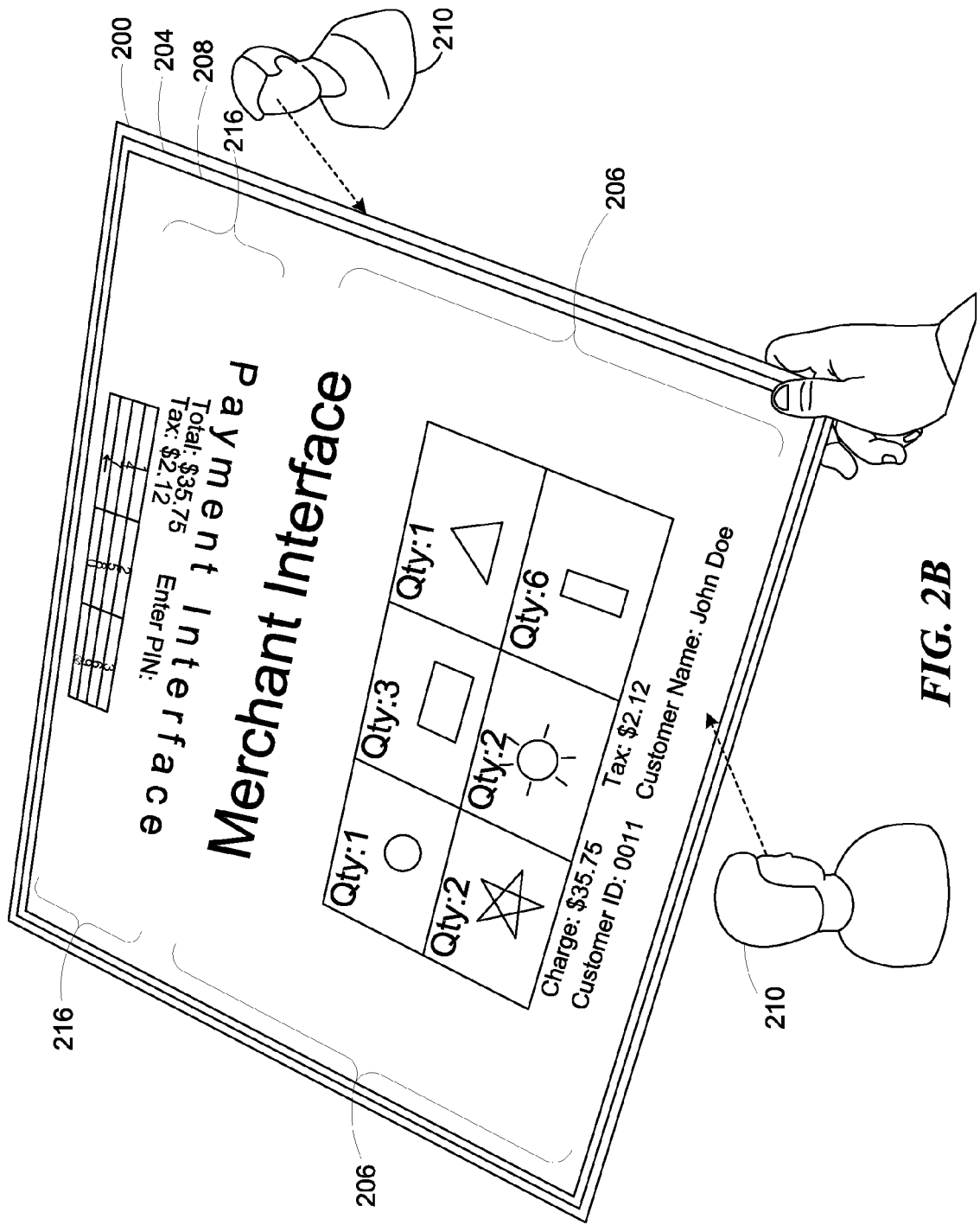
Figure 2C:
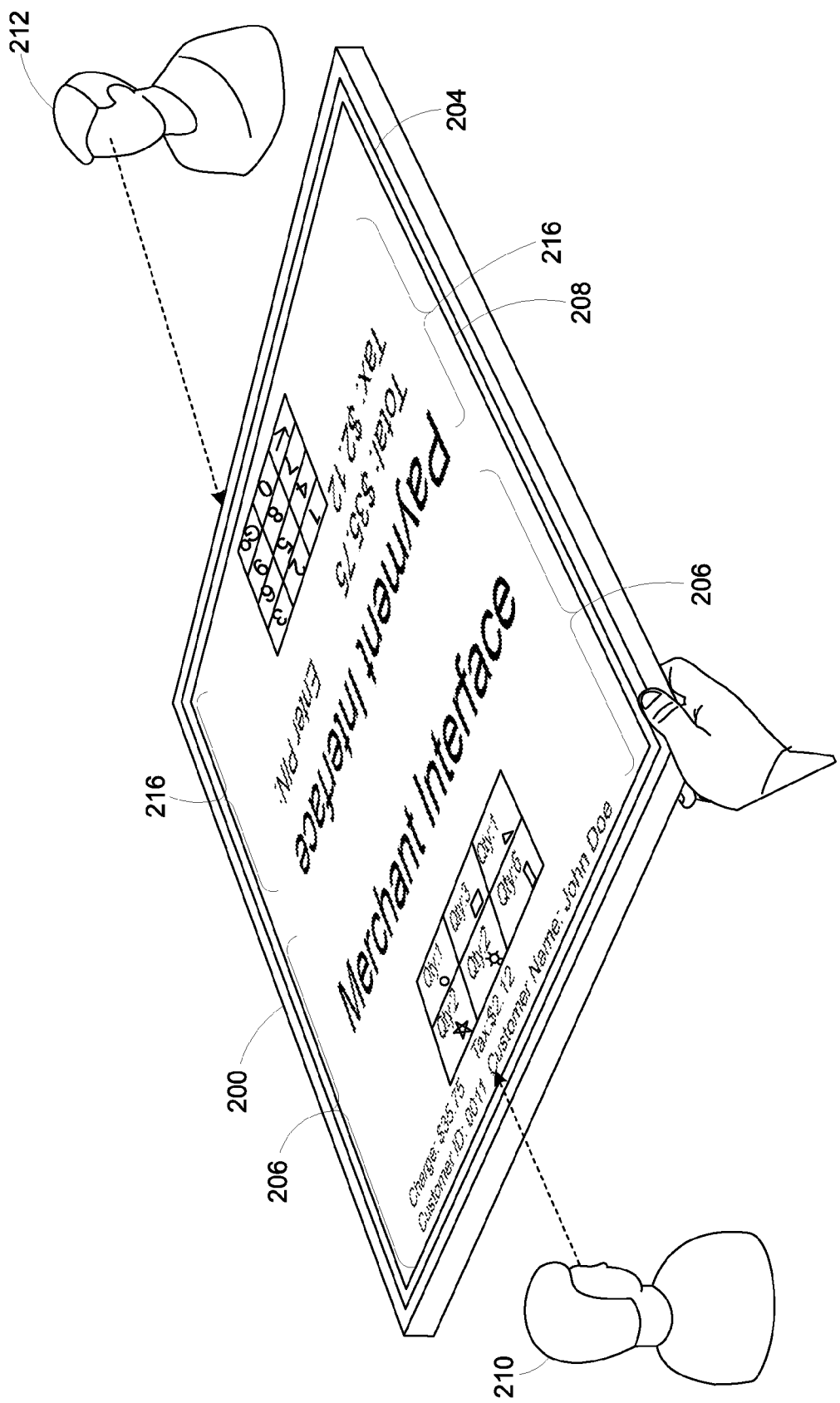

FIGS. 2A-2C illustrate a second embodiment of a rolling interface transition technique for user interfaces implemented on a mobile device 200 from a first perspective view. The mobile device 200 can be a general purpose device with data processing capabilities. For example, the mobile device 200 can be a mobile phone, a tablet, an e-reader, or other mobile or portable computing devices. The mobile device 200 can include a display screen 204, such as a liquid crystal display (LCD) or an organic light emitting diode display (OLED). The display screen 204 can be part of a touchscreen.

The mobile device 200 can implement an application, such as a mobile register application, where the application includes a merchant interface instance 206. The merchant interface instance 206 is a user interface intended for a merchant (e.g., an interface to process and checkout item/services purchased) displayed on a view window 208 of the display screen 204. As shown, the view window 208 takes up nearly the entirety of the display screen 204. However, it is noted that the view window 208 can take up the entirety or any portion of the display screen 204.

The first perspective view is shown from the same side as a merchant user 210. As shown through the sequence of illustrations from FIGS. 2A-2F, the merchant user 210 can rotate the mobile device 200 in a rotational motion, first pointing the display screen 204 face up, and then towards a consumer user 212. The rotational motion is coupled to an interface transition animation. The mobile device 200 can store a set trajectory of how the rotational motion is expected progress. When the mobile device 200 is positioned at each end of the set trajectory, only one of the user interfaces (e.g., the merchant interface instance 206 or the consumer interface instance 216) would be displayed in the view window 208. Size of the view window 208 can remain constant throughout the interface transition animation.

In this embodiment, the interface transition animation includes shrinking (i.e., contracting) the merchant interface instance 206 in height (i.e., displaying the full merchant interface instance 206 at a smaller height) to free up space on the view window 208 to fit a consumer interface instance 216. The full consumer interface instance 216 is fitted to the remaining space on the view window 208 as freed up from the shrinking of the merchant interface instance 206. The shrinking of the merchant interface instance 206 can be controlled according to a rotary progression of the rotational motion. Rotary progression of the rotational motion is a proportional fraction of the mobile device's position and/or orientation along the set trajectory. For example, the rotary progression can be a proportional fraction of a total angle of expected rotation or a proportional fraction of a position along a curved line, such as a half circle, an arch or a partial arc.

In FIG. 2A, the merchant interface instance 206 takes up the entirety of the view window 208. The merchant user 210 or a physical structure can be holding the mobile device 200 nearly upright such that the display screen 204 is substantially orthogonal to the ground. In FIG. 2B, the mobile device 200 has been rotated by the merchant user 210 by approximately a 45° angle. As part of the interface transition animation, the merchant interface instance 206 shrinks in height, and now occupies only three fourth of the view window 208. The bottom of the merchant interface instance 206 remains in contact with the bottom edge of the view window 208 throughout the interface transition. Where a space is freed up by the shrinking in height of the merchant interface instance 206, the consumer interface instance 216 can expand to fit into the freed up space in the view window 208. In FIG. 2C, the mobile device 200 has further been rotated by the merchant user 210 by approximately a 45° angle from the orientation in FIG. 2B. As part of the interface transition animation where the merchant interface instance 206 continues to shrink in height, the merchant interface instance 206 now takes up half of the view window 208 where the consumer interface instance 216 occupies the other half.

Figure 2D:
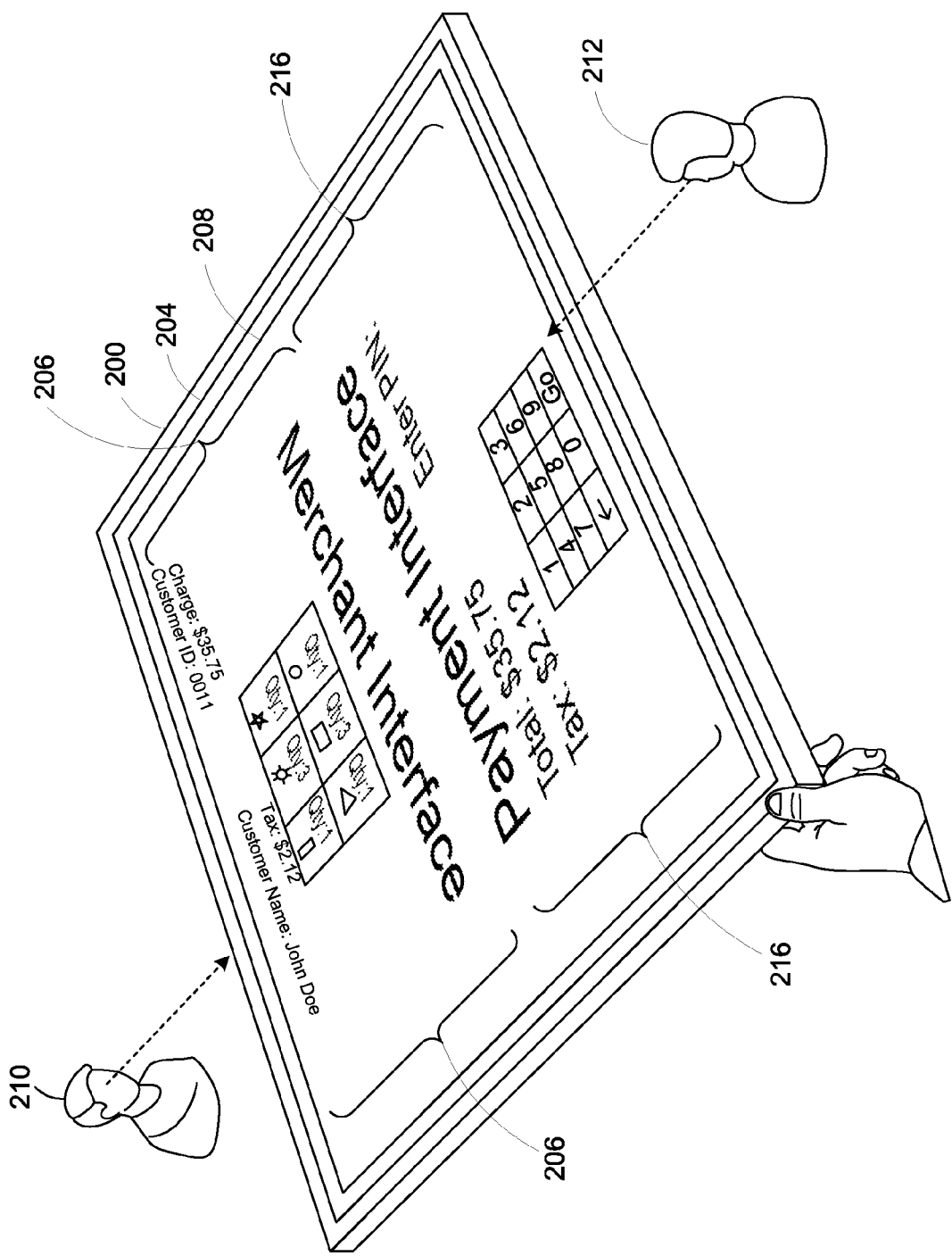
FIGS. 2D-2F illustrate the second embodiment of a rolling interface transition technique for the user interfaces implemented on the mobile device from a second perspective view.
Figure 2E:
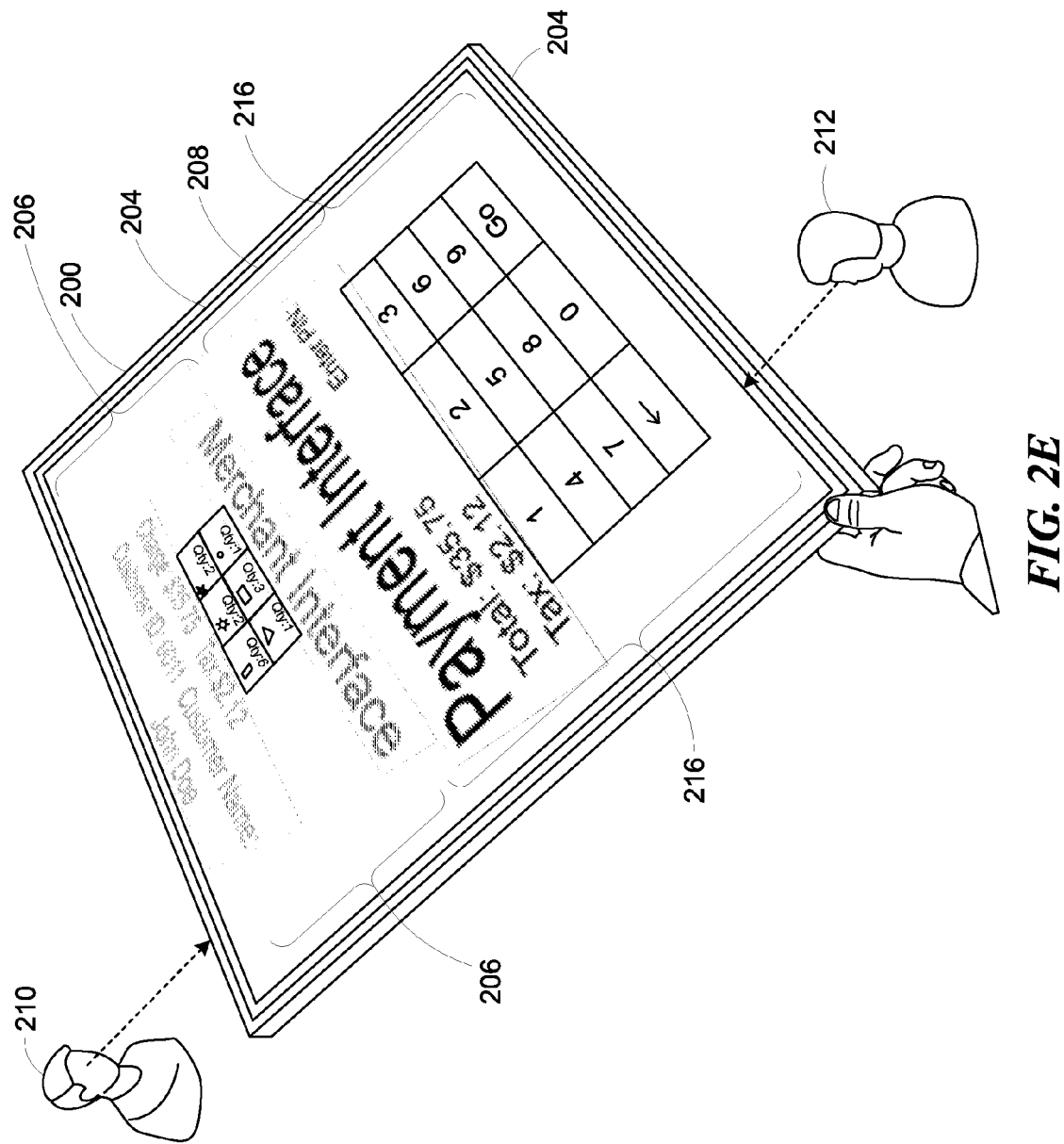
Figure 2F:
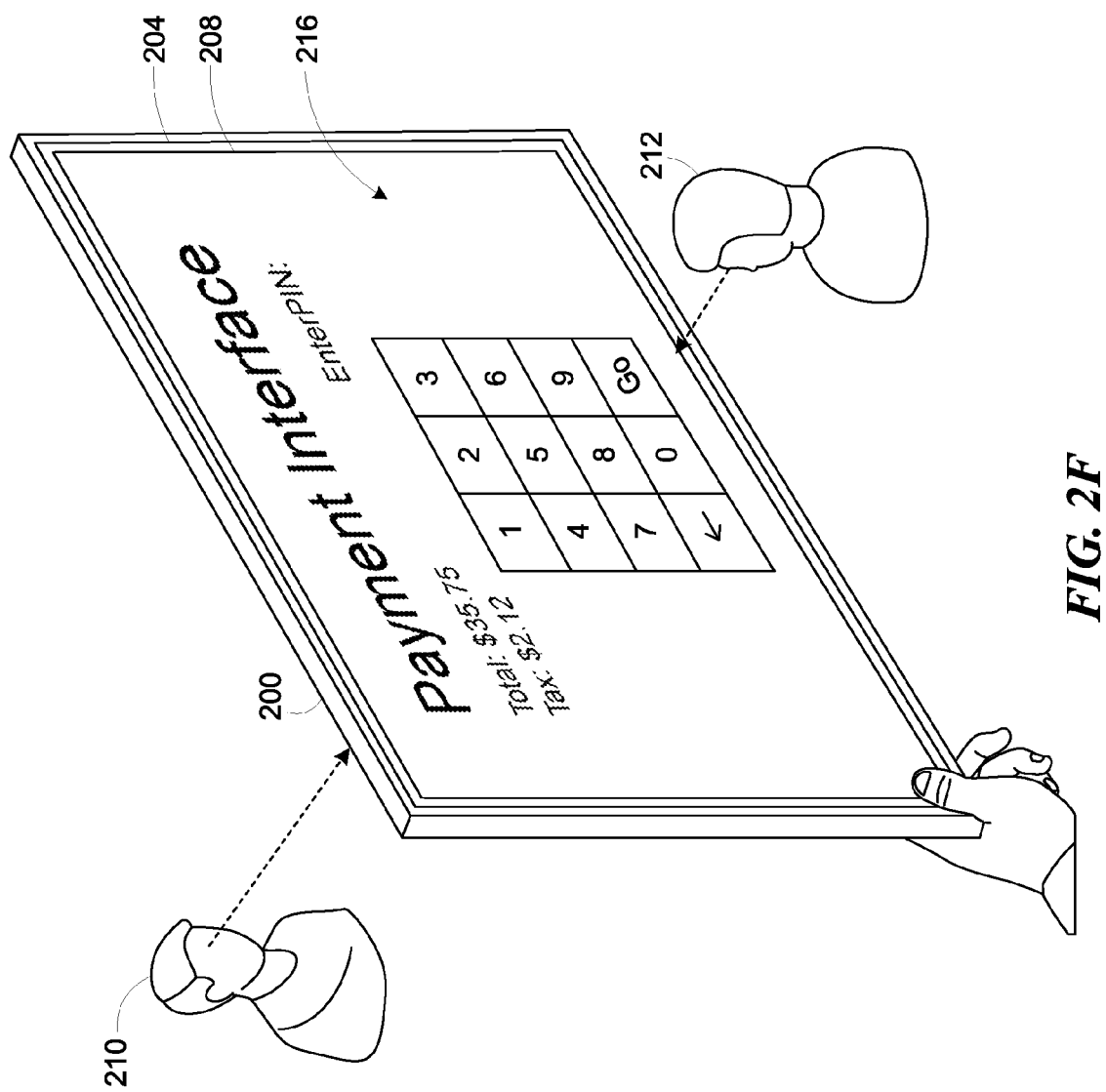

FIGS. 2D-2F illustrate the second embodiment of the rolling interface transition technique for the user interfaces implemented on the mobile device 200 from a second perspective view. The second perspective view is shown from the same side as the consumer user 212. The second perspective view can be opposite from the first perspective view. FIGS. 2D-2F continues to illustrate an example trajectory of the rotational motion as rotated by either the merchant user 210 or the consumer user 212.

FIG. 2D can represent the same state of the interface transition animation on the display screen 204 as in FIG. 2C, except shown from the second perspective view. The consumer interface instance 216, reduced to half its height, now occupies half of the view window 208 while the merchant interface instance 206 reduced to half its height occupies the other half of the view window 208. In FIG. 2E, the mobile device 200 is further rotated by approximately 45° angle from the orientation of the mobile device 200 in FIG. 2D. As part of the interface transition animation, the consumer interface instance 216 expands further to occupy three fourth of the view window 208. The merchant interface instance 206 shrinks further occupying the remaining one fourth of the view window 208. In FIG. 2F, the mobile device 200 completes the set trajectory of the rotational motion. The interface transition animation terminates with the consumer interface instance 216 taking up the entirety of the view window 208.

Figure 3:
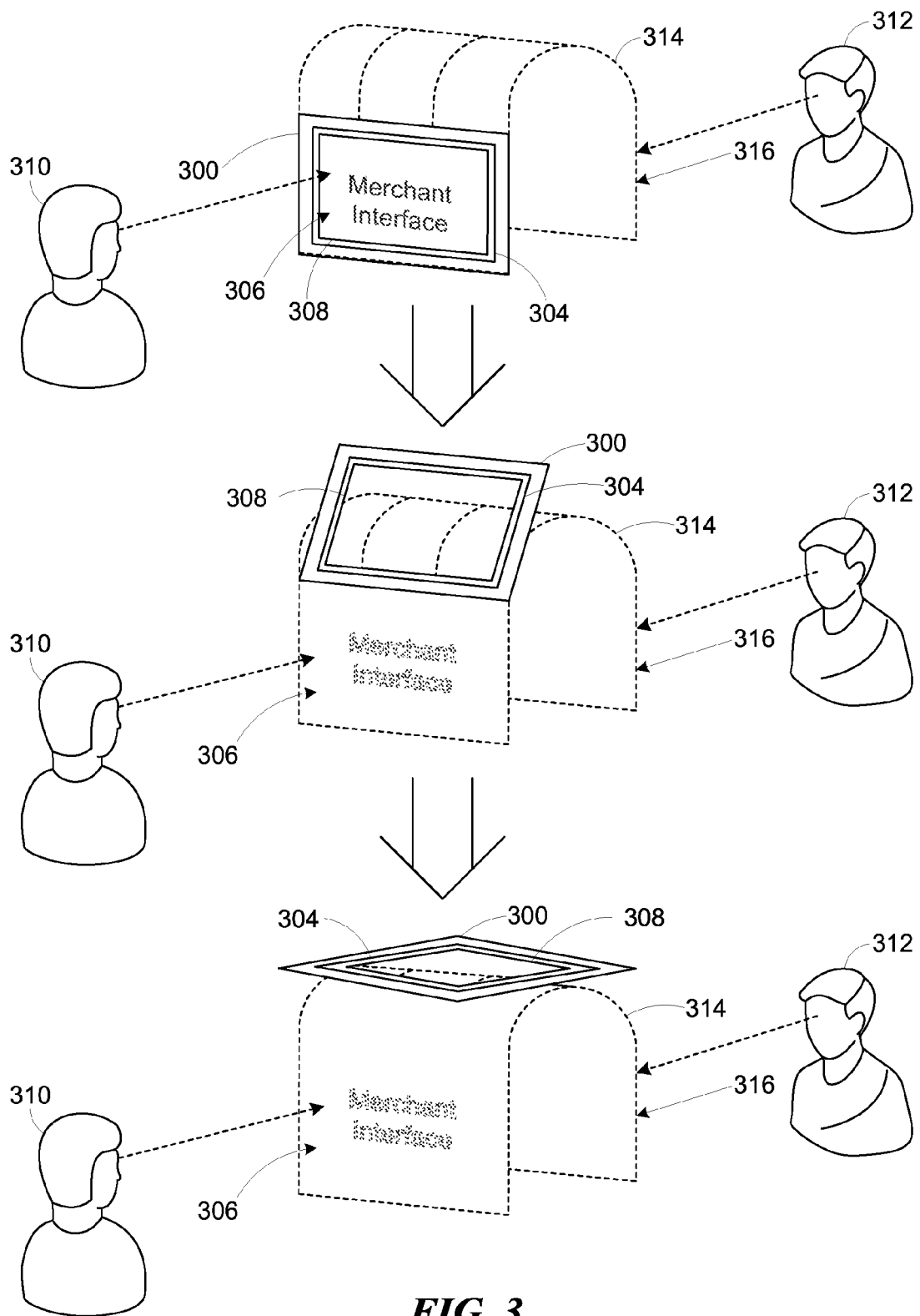
FIG. 3 is a flow diagram illustrating a third embodiment of a rolling interface transition technique for user interfaces implemented on a mobile device.

FIG. 3 is a flow diagram illustrating a third embodiment of a rolling interface transition technique for user interfaces implemented on a mobile device 300. The mobile device 300 can be a general purpose device with data processing capabilities. For example, the mobile device 300 can be a mobile phone, a tablet, an e-reader, or other mobile or portable computing devices. The mobile device 300 can include a display screen 304, such as a liquid crystal display (LCD) or an organic light emitting diode display (OLED). The display screen 304 can be part of a touchscreen.

The mobile device 300 can implement an application, such as a mobile register application, where the application includes a merchant interface instance 306. The merchant interface instance 306 is a user interface intended for a merchant (e.g., an interface to process and checkout item/services purchased) displayed on a view window 308 of the display screen 304. As shown, the view window 308 takes up nearly the entirety of the display screen 304. However, it is noted that the view window 308 can take up the entirety or any portion of the display screen 304.

The flow diagram of FIG. 3 is shown from a perspective view on the same side as a merchant user 310. As shown through the sequence of illustrations in FIG. 3, the merchant user 310 can rotate the mobile device 300 in a rotational motion, first pointing the display screen 304 face up, and then towards a consumer user 312. The rotational motion is coupled to an interface transition animation. The mobile device 300 can store a set trajectory of how the rotational motion is expected progress. When the mobile device 300 is positioned at each end of the set trajectory, only one of the user interfaces (e.g., the merchant interface instance 306 or the consumer interface instance 316) would be displayed in the view window 308. Size of the view window 308 can remain constant throughout the interface transition animation.

In the embodiment illustrated, the mobile device 300 maps the merchant interface instance 306 and the consumer interface instance 316 to a virtual curved sheet surface 314 in a three-dimensional space. The merchant interface instance 306 and the consumer interface instance 316 can be mapped onto equal and opposite sides of the virtual curved sheet surface 314. The virtual curved sheet surface 314 can be curved in a shape that tracks a curvature of the set trajectory of the rotational motion.

In this embodiment, the interface transition animation includes rendering a portion of the virtual curved sheet surface 314 through the view window 308. The view window 308 moves along the virtual curved sheet surface 314 at a constant distance normal to the virtual curved sheet surface 314. Position of the view window 308 in the three-dimensional space serves as a camera that dictates what portion of the virtual curved sheet surface 314 is displayed on the view window 308. The movement of the view window 308 can be controlled in accordance with the rotary progression of the rotational motion. The movement of the view window 308 can track the rotational motion, moving and rotating along a curvature of the virtual curved sheet surface 314.

Figure 4:
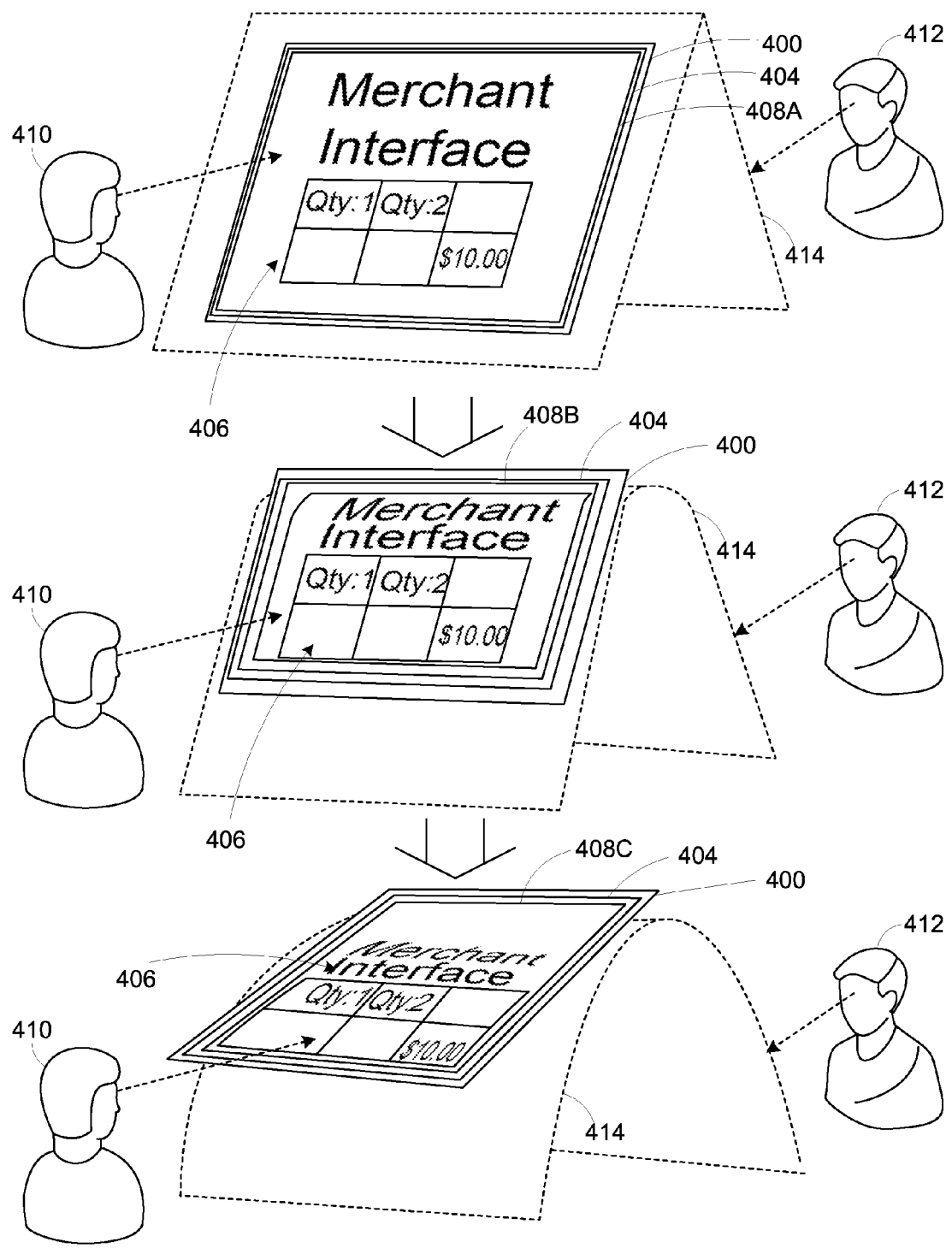
FIG. 4 is a flow diagram illustrating a fourth embodiment of a rolling interface transition technique for user interfaces implemented on a mobile device.

FIG. 4 is a flow diagram illustrating a fourth embodiment of a rolling interface transition technique for user interfaces implemented on a mobile device 400. The mobile device 400 can be a general purpose device with data processing capabilities. For example, the mobile device 400 can be a mobile phone, a tablet, an e-reader, or other mobile or portable computing devices. The mobile device 400 can include a display screen 404, such as a liquid crystal display (LCD) or an organic light emitting diode display (OLED). The display screen 304 can be part of a touchscreen.

The mobile device 400 can implement an application, such as a mobile register application, where the application includes a merchant interface instance 406. The merchant interface instance 406 is a user interface intended for a merchant (e.g., an interface to process and checkout item/services purchased) displayed on a view window 408 of the display screen 404. As shown, the view window 408 takes up nearly the entirety of the display screen 404. However, it is noted that the view window 408 can take up the entirety or any portion of the display screen 404.

The flow diagram of FIG. 4 is shown from a perspective view on the same side as a merchant user 410. As shown through the sequence of illustrations in FIG. 4, the merchant user 410 can rotate the mobile device 400 in a rotational motion, first pointing the display screen 404 face up, and then towards a consumer user 412. The rotational motion is coupled to an interface transition animation. The mobile device 400 can store a set trajectory of how the rotational motion is expected progress. When the mobile device 400 is positioned at each end of the set trajectory, only one of the user interfaces (e.g., the merchant interface instance 406 or the consumer interface instance 416) would be displayed in the view window 408. Size of the view window 408 can remain constant throughout the interface transition animation.

In the embodiment illustrated, the mobile device 400 maps the merchant interface instance 406 and the consumer interface instance 416 to a virtual curved sheet surface 414 in a three-dimensional space. The merchant interface instance 406 and the consumer interface instance 416 can be mapped onto equal and opposite sides of the virtual curved sheet surface 414. The virtual curved sheet surface 414 can be curved in a shape that tracks a curvature of the set trajectory of the rotational motion.

In this embodiment, the interface transition animation includes rendering a portion of the virtual curved sheet surface 414 through the view window 408. The view window 408 moves along the virtual curved sheet surface 414 at a constant distance normal to the virtual curved sheet surface 414. Position of the view window 408 in the three-dimensional space serves as a camera that dictates what portion of the virtual curved sheet surface 414 is displayed on the view window 408. The movement of the view window 408 can be controlled in accordance with the rotary progression of the rotational motion. The movement of the view window 408 can track the rotational motion, moving and rotating along a curvature of the virtual curved sheet surface 414.

The interface transition animation also includes adjusting a curvature of the virtual curved sheet surface 414 while the view window 408 is moving and rotating as described above. For example, the mobile device 400 can widen the curvature until a bisector of the view window 408 aligns with a bisecting plane of the virtual curved sheet surface 414 and narrow thereafter along the set trajectory. For another example, the mobile device 400 can widen the curvature until the mobile device 400 is oriented or positioned at a midpoint of the set trajectory, and narrow thereafter along the set trajectory.

Figure 5:
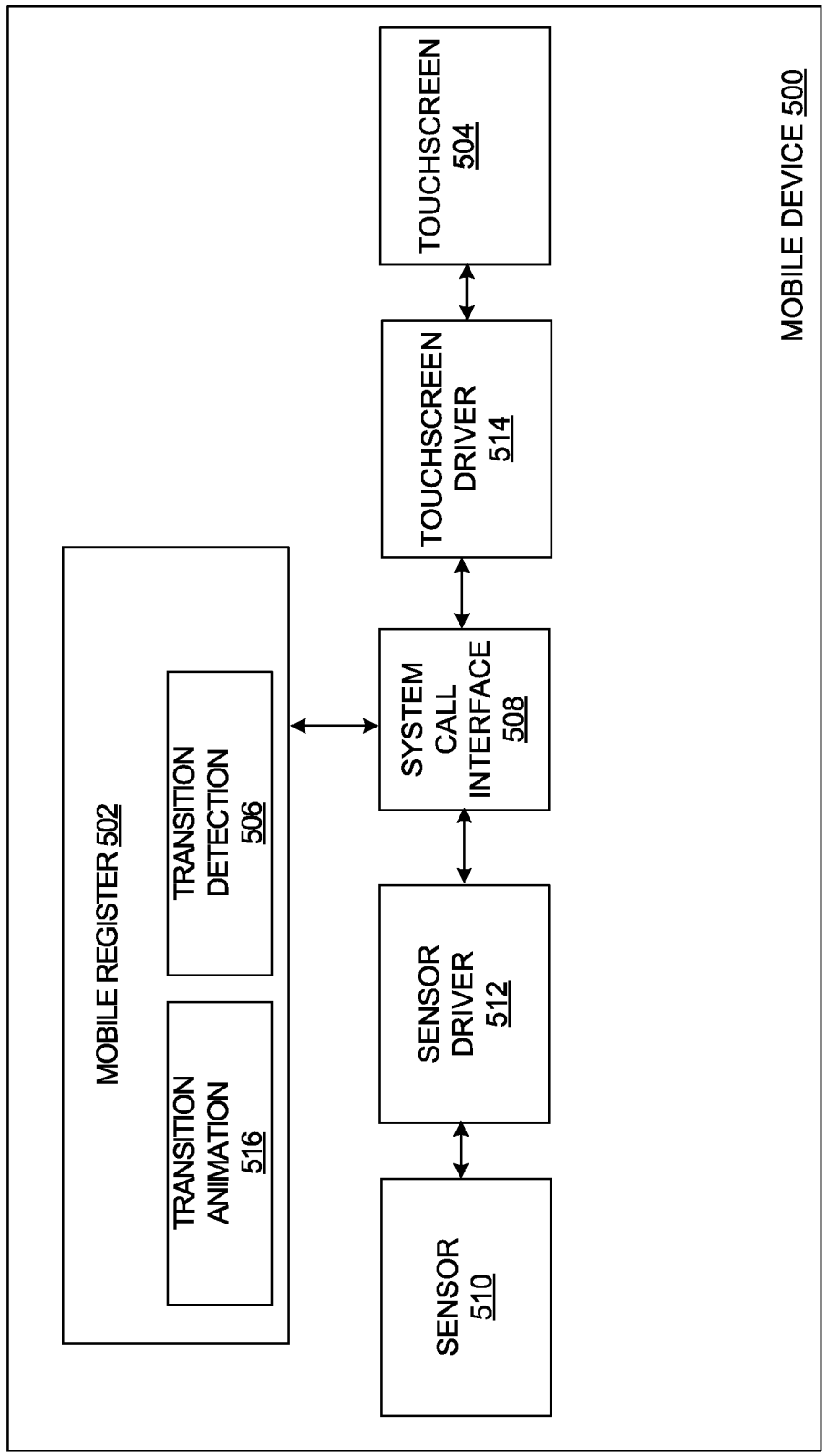
FIG. 5 illustrates a block diagram of a mobile device.

FIG. 5 illustrates a block diagram of a mobile device 500, such as the mobile device 100 of FIGS. 1A-1F, the mobile device 200 of FIGS. 2A-2F, the mobile device 300 of FIG. 3, or the mobile device 400 of FIG. 4. The mobile device 500 can be a general-purpose computing device.

The mobile device 500 includes a mobile register module 502, which is configured to present and maintain user interfaces to emulate a payment register at a store. In various embodiments, the mobile register module 502 is configured to generate a merchant interface instance (e.g., the merchant interface instance 106, the merchant interface instance 206, the merchant interface instance 306, or the merchant interface instance 406) and a consumer interface instance (e.g., the consumer interface instance 116, the consumer interface instance 216, the consumer interface instance 316, or the consumer interface instance 416). The merchant interface instance and the consumer interface instance can be displayed on a touchscreen 504 of the mobile device 500, one at the time, or partially or wholly together during an interface transition period. The touchscreen 504 may include a display and a touch sensor. In some embodiments, some features of the mobile register module 502 is locked out while the consumer interface instance is displayed (e.g., when a sensor determines that the touchscreen 504 is facing towards a consumer). For example, the consumer can be prevented from exiting the mobile register application or access anything else that only a merchant has the privilege to.

The mobile register module 502 can include a transition detection module 506, which is configured to determine when to initiate an interface transition from the merchant interface instance to the consumer interface instance or vice versa. The transition detection module 506 can initiate the interface transition in response to a manual command from the user, such as a user interaction with an interface element on either the merchant interface instance or the consumer interface instance. The transition detection module 506 can also initiate the interface transition in response to detecting a rotational motion of the mobile device 500. For example, the transition detection module 506 can determine the rotational motion by communicating with a system call interface 508, which is part of an operating system kernel of the mobile device 500. The system call interface 508 can communicate to various drivers for hardware devices of the mobile device 500.

The mobile device 500 can include a sensor 510, which can measure a value based on a physical attribute (e.g., orientation, position, or acceleration) or its derivative (e.g., a first derivative or a second derivative) relating the mobile device 500, where the physical attribute or its derivative is indicative of a motion of the mobile device 500, such as a rotational motion. The sensor 510 is controlled by a sensor driver 512. The sensor driver 512 records a sequence of the measured values. The sensor driver 512 can run on a kernel level of the operating system of the mobile device 500. For example, the sensor driver 512 can be coupled to the system call interface 508.

Likewise, the operating system of the mobile device 500 can also include a touchscreen driver 514 controlling the touchscreen 504. The mobile register module 502 can communicate with the touchscreen driver 514 through the system call interface 508 to display the merchant interface instance, the consumer interface instance, or an interface transition animation. The mobile register module 502 can further communicate with the touchscreen driver 514 to capture user interactions with interface elements on the merchant interface instance or the consumer interface instance.

In various embodiments, the transition detection module 506 communicates with the sensor driver 512 through the system call interface 508. The transition detection module 506 can be configured to detect a particular motion pattern to trigger the interface transition. The transition detection module 506 can identify the particular motion pattern by determining a movement of the mobile device from the sequence of the measured values. In some embodiments, the transition detection module 506 can communicate with multiple sensor drivers, each measuring a type of physical quantity indicative of the particular motion pattern.

The particular motion pattern can be a particular rotational motion. The particular rotational motion can be defined by a curvature (e.g., a radius), a duration, a distance (e.g., diameter of the rotational motion or traversal distance), an orientation, or any combination thereof. For example, the particular rotational motion can be restricted to a diameter of a human arm's length. As another example, the particular rotational motion can be restricted to when the touchscreen 504 is oriented upwards away from the ground as part of the rotational motion. As yet another example, the particular rotational motion can be restricted to a duration between a tenth of a second to four seconds.

The mobile register module 502 can include a transition animation module 516, which is configured to render and control a transition animation based on the rotational motion in real-time. The transition animation can be based on any of the embodiments illustrated in FIGS. 1A-1F, FIGS. 2A-2F, FIG. 3, or FIG. 4. The transition animation module 516 can communicate with the sensor driver 512 through the system call interface 508. The transition animation module 516 renders the transition animation based on a progression of the particular rotational motion identified by the transition detection module 506. The speed of which the transition animation unfolds can be coupled directly to the speed of the particular rotational motion. Whenever the particular rotational motion pauses, the transition animation module 516 can pause the transition animation as well. Whenever the particular rotational motion reverses, the transition animation module 516 can reverse the transition animation as well.

Blocks, components, and/or modules associated with the mobile device 500 each may be implemented in the form of special-purpose circuitry, or in the form of one or more programmable processors that are programmed to provide the functionality described above, or in a combination of such forms. For example, the modules described can be implemented as instructions on a tangible storage memory capable of being executed by a processor or a controller on a machine. The tangible storage memory can be a volatile or a non-volatile memory. In some embodiments, the volatile memory can be considered "non-transitory" in the sense that it is not a transitory signal. Modules can be operable when executed by a processor or other computing device, e.g., a single board chip, application specific integrated circuit, a field programmable field array, a network capable computing device, a virtual machine terminal device, a cloud-based computing terminal device, or any combination thereof.

Each of the modules can operate individually and independently of other modules. Some or all of the modules can be executed on the same host device or on separate devices. The separate devices can be coupled via a communication module to coordinate its operations via an interconnect or wirelessly. Some or all of the modules can be combined as one module.

A single module can also be divided into sub-modules, each sub-module performing separate method step or method steps of the single module. In some embodiments, the modules can share access to a memory space. One module can access data accessed by or transformed by another module. The modules can be considered "coupled" to one another if they share a physical connection or a virtual connection, directly or indirectly, allowing data accessed or modified from one module to be accessed in another module. In some embodiments, some or all of the modules can be upgraded or modified remotely. The mobile device 500 can include additional, fewer, or different modules for various applications.

Figure 6:
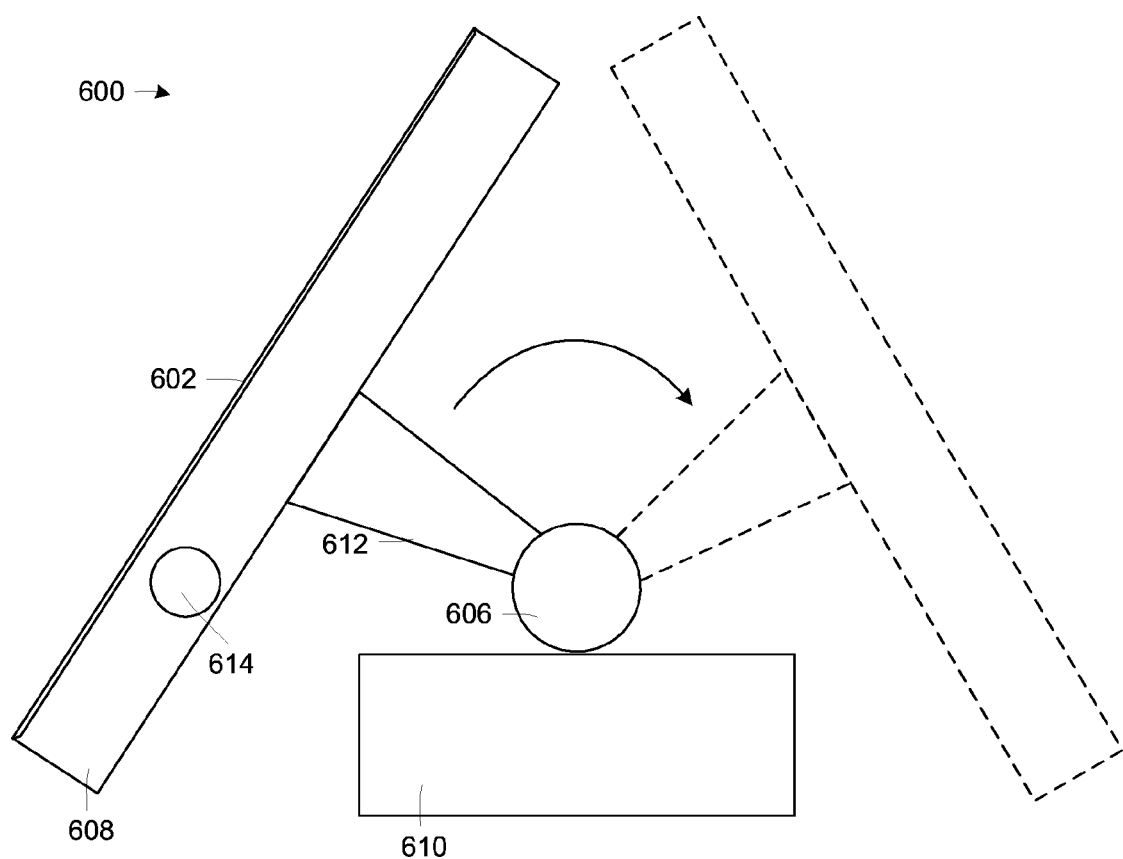
FIG. 6 illustrates a mobile device mounted on a rotary docking station.

FIG. 6 illustrates a mobile device 602 mounted on a rotary docking station 600. The mobile device 602 can be the mobile device 100 of FIGS. 1A-1F, the mobile device 200 of FIGS. 2A-2F, the mobile device 300 of FIG. 3, the mobile device 400 of FIG. 4, or the mobile device 500 of FIG. 5. The rotary docking station 600 can be adapted to facilitate a rolling interface transition as illustrated in the embodiments of FIGS. 1A-1F, FIGS. 2A-2F, FIG. 3, or FIG. 4. The rotary docking station 600 can include a hinge 606, a frame 608, and a base 610. The hinge 606 can rotate along at least one axis. The frame 608 can be attached to the hinge via a support armed 612. The mobile device 602 can be mounted on the rotary docking station 600 by fitting into a cavity on the frame 608.

Rotational movement of the frame 608 carrying the mobile device 602 can trigger a rolling interface transition as detected by the transition detection module 506 of FIG. 5. Once the rolling interface transition is initiated, each position of the frame 608 can correspond to a different animation frame of the interface transition animation generated by the transition animation module 516 of FIG. 5.

In some embodiments, the rotary docking station 600 may include a sensor 614 for detecting a motion of the mobile device 602. For example, the sensor 614 can detect orientation, motion, acceleration, position, direction, or any combination thereof.

Figure 7:
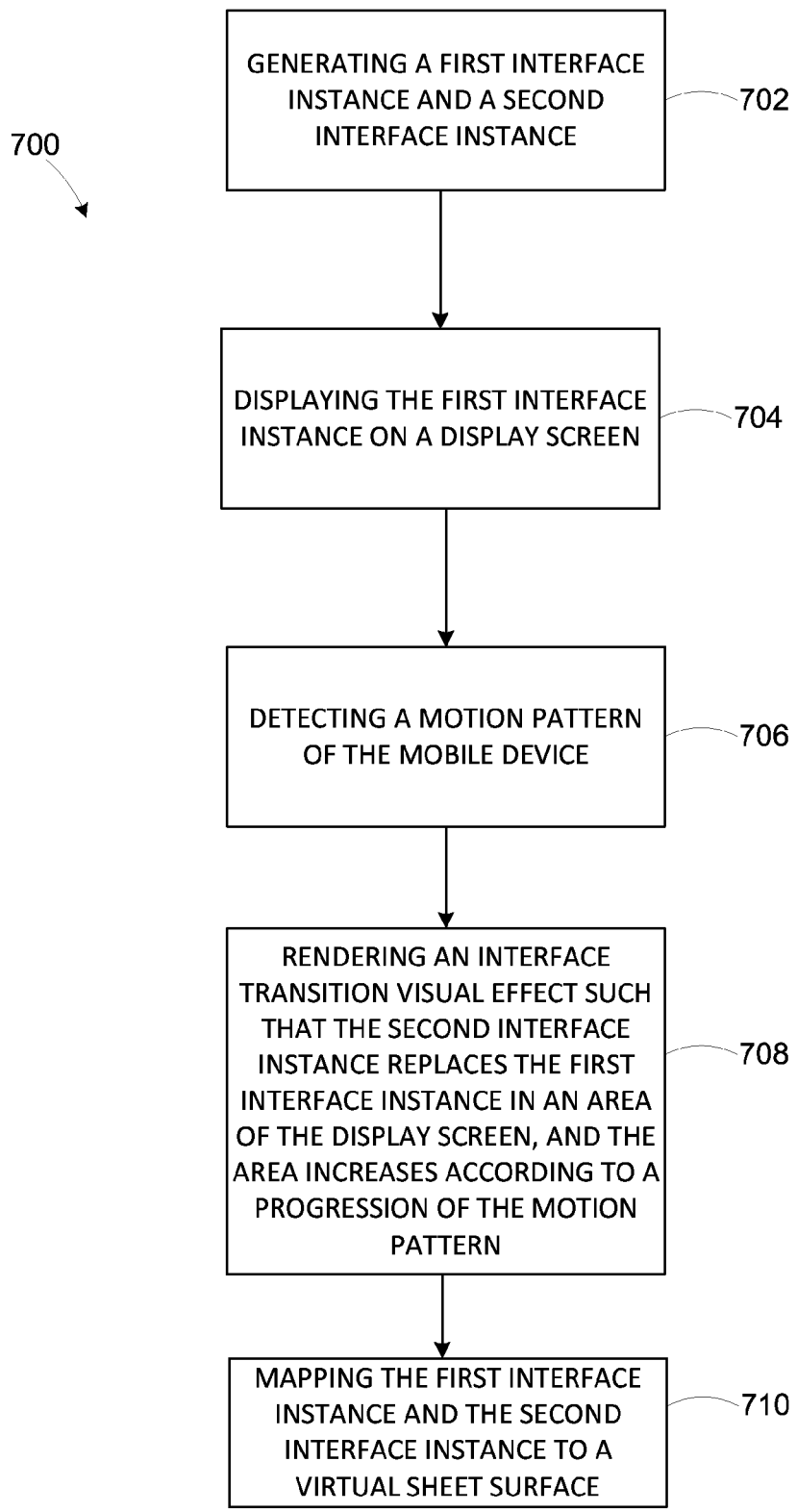
FIG. 7 illustrates a flow chart of a process of implementing a rolling interface transition technique on a mobile device.

FIG. 7 illustrates a flow chart of a process 700 of implementing a rolling interface transition technique on a mobile device (e.g., the mobile device 100 of FIGS. 1A-1F, the mobile device 200 of FIGS. 2A-2F, the mobile device 300 of FIG. 3, the mobile device 400 of FIG. 4, the mobile device 500 of FIG. 5, or the mobile device 602 of FIG. 6). The mobile device generates a first interface instance and a second interface instance at step 702. The first interface instance can be a merchant interface instance, such as the merchant interface instance 106, the merchant interface instance 206, the merchant interface instance 306, or the merchant interface instance 406. The second interface instance can be a consumer interface instance, such as the consumer interface instance 116, the consumer interface instance 216, the consumer interface instance 316, or the consumer interface instance 416. In some embodiments, the merchant interface instance is display in response to receiving, from a card reader coupled to the mobile device, an indication to initiate a financial transaction between a merchant and a consumer. Step 702 can be performed by the mobile register module 502 of FIG. 5 or on a remote server, where the mobile register interface is sent over to the mobile device from the remote server.

Once the first interface instance is generated, the mobile device can first display the first interface instance on a display screen of the mobile device at step 704. The display screen can be a touchscreen. Step 704 can be performed by the mobile register 502, the system call interface 508, the touchscreen driver 514, and the touchscreen 504 working in conjunction.

While the display screen is displaying the first interface instance, the mobile device can detect a motion pattern of the mobile device at step 706. The motion pattern can be detected via a sensor mechanically coupled the mobile device, such as the sensor 510 of FIG. 5 or a sensor on a docking station for the mobile device. The motion pattern can be any rotational motion or a particular rotational motion as restricted by motion duration, motion distance, motion angle, motion speed, motion direction/orientation, or any combination thereof. Detection of the motion pattern can also include detection of a reversal of the motion pattern. Step 706 can be performed by the mobile register 502, the system call interface 508, the sensor driver 512, and the sensor 510.

Once the mobile device detects the motion pattern, the mobile device initiates an interface transition that is controlled by the motion pattern. The interface transition triggers an interface animation that changes a display of the first interface instance on the display screen to a display of the second interface instance. The interface transition includes the mobile device rendering an interface transition visual effect at step 708. The interface transition visual effect is a dynamic interface transition animation rendered in real-time in accordance with the detected motion pattern. The interface transition animations includes a gradual/smooth replacement of the first interface instance in an area of the display screen while the area increases according to a progression of the motion pattern. The motion pattern can be defined with a set trajectory. The progression is a proportional fraction of the mobile device's position and/or along the set trajectory. For example, the progression can be a rotary progression of a rotational motion. The rotary progression can be a proportional fraction of a total angle of expected rotation or a proportional fraction of a position along a curved line, such as a half circle, an arch or a partial arc.

A speed of the motion pattern can control an animation speed of the interface transition animation. In some embodiments, when the mobile device detects a reversal of the motion pattern, the interface transition animation is played back in reverse. In the case when the motion pattern is a rotational motion, the second interface instance is introduced in the interface transition animation oriented opposite to an orientation of the first interface instance. Further in such case, the second interface instance can be introduced from a frontier edge of the display screen in a direction of the rotational motion. The frontier edge is an edge of the display screen that moves ahead the most along the set trajectory of the rotational motion.

In an embodiment similar to the illustrated embodiment in FIGS. 1A-1F, the interface transition animation can include shifting in a portion of the second interface instance while shifting out a portion of the first interface instance. In the embodiment, the shifting movement can be controlled according to the rotary progression of the rotational motion, where the amount shifted is proportional to how much the mobile device has progressed in the set trajectory of the rotational motion. The portion of the second interface instance can be shifted in from a top edge of a view window of the display screen and the portion of the first interface instance can be shifted out from a bottom edge of the view window.

In an embodiment similar to the illustrated embodiment in FIGS. 2A-2F, the interface transition animation can include contracting the first interface instance in height (i.e., displaying the full interface at a smaller height) to free up space on the display screen to fit the second interface instance. The contraction of the first interface instance can be controlled in accordance with the progression of the motion pattern, such as the rotary progression of the rotational motion.

In some embodiments, the process 700 can include step 710, where the mobile device maps the first interface instance and the second interface instance to a virtual sheet surface. The first interface instance and the second interface instance can be mapped onto equal and opposite sides of the virtual sheet surface. The virtual sheet surface can be curved in a shape that tracks a curvature of the set trajectory of the rotational motion.

In an embodiment similar to the illustrated embodiment in FIG. 3, the interface transition animation can include rendering a portion of the virtual sheet surface through a virtual camera window moving along the virtual sheet surface at a constant distance normal to the virtual sheet surface. The virtual camera window dictates what portion of the virtual sheet surface is displayed on the display screen. In the case where the motion pattern is a rotational motion, the movement of the virtual camera window can be controlled in accordance with the rotary progression of the rotational motion. Further, in such case, the movement of the virtual camera window can track the rotational motion including rotating the virtual camera window along a curvature of the virtual sheet surface.

In an embodiment similar to the illustrated embodiment of FIG. 4, the interface transition animation can include adjusting a curvature of a virtual curved sheet surface while the virtual camera window is moving as described above. For example, the mobile device can widen the curvature until a bisector of the virtual camera window aligns with a bisecting plane of the virtual curved sheet surface.

Regarding the process 700, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or subcombinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples: alternative implementations can employ differing values or ranges.

Figure 8:
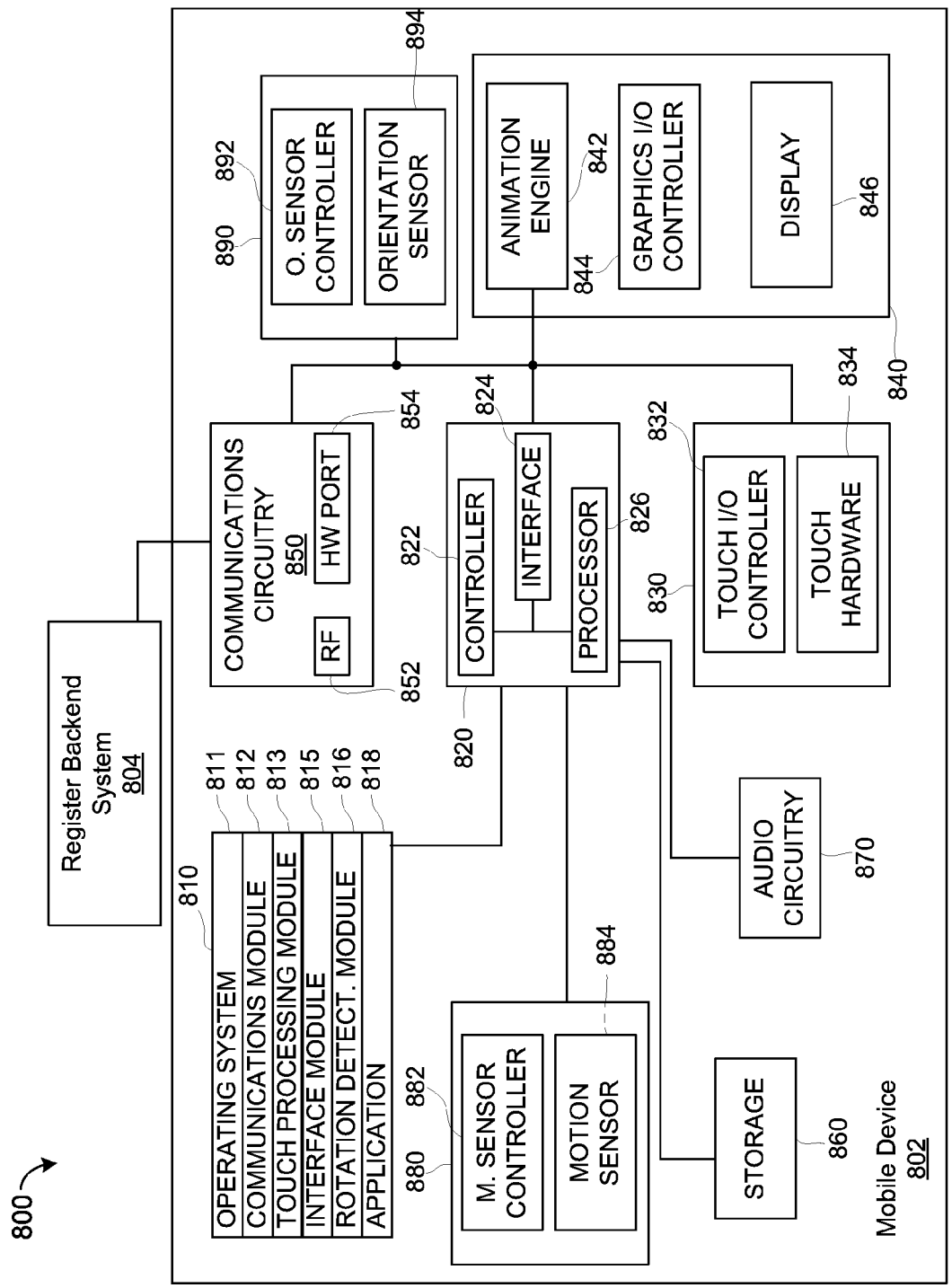
FIG. 8 illustrates a block diagram of a mobile register system including a mobile device and a register backend system.

FIG. 8 illustrates a block diagram of a mobile register system 800 including a mobile device 802 (e.g., the mobile device 100 of FIGS. 1A-1F, the mobile device 200 of FIGS. 2A-2F, the mobile device 300 of FIG. 3, the mobile device 400 of FIG. 4, the mobile device 500 of FIG. 5, or the mobile device 602 of FIG. 6) and a register backend system 804. Note that the architecture shown in FIG. 8 is only an example of an architecture for a mobile register system in accordance with the technique introduced here; further, the mobile device 802 in FIG. 8 can have more or fewer components than shown, or a different configuration of components. The various components shown in FIG. 8 can be implemented by using hardware, software, firmware or a combination thereof, including one or more signal processing and/or application specific integrated circuits.

The mobile device 802 that can include one or more computer-readable mediums 810, processing system 820, touch subsystem 830, display/graphics subsystem 840, communications circuitry 850, storage 860, audio circuitry 870, motion sensor subsystem 880, and orientation detection subsystem 890. These components can be coupled by one or more communication buses or other signal lines.

The communications circuitry 850 can include RF circuitry 852 and/or port 854 for sending and receiving information. The RF circuitry 852 permits transmission of information over a wireless link or network to one or more other devices and includes well-known circuitry for performing this function. For example, the RF circuitry 852 can enable WiFi, cellular, Bluetooth, Bluetooth low energy, global positioning system (GPS), near field communication (NFC), or other types of long range or short range communication. The port 854 permits transmission of information over a wired link. The communications circuitry 850 can communicate, for example, with the register backend system 804. The communications circuitry 850 can be coupled to the processing system 820 via a peripherals interface 824. The peripherals interface 824 can include various known components for establishing and maintaining communication between peripherals and the processing system 820.

The audio circuitry 870 can be coupled to an audio speaker (not shown), a microphone (not shown), an electronic card reader (not shown), or any combination thereof and includes known circuitry for processing voice signals received from the peripherals interface 824. The audio circuitry 870 enables communication in real-time with the user, such as through audio indication of an interface transition, or other audio elements of the user interfaces on the mobile device 802. In some embodiments, the audio circuitry 870 includes a headphone jack (not shown).

The peripherals interface 824 can with couple various peripherals, such as an electronic card reader, of the system to one or more processors 826 and the computer-readable medium 810. The one or more processors 826 can communicate with one or more computer-readable mediums 810 via a controller 822. The computer-readable medium 810 can be any device or medium that can store code and/or data for use by the one or more processors 826. The medium 810 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 810 can also include a transmission medium for carrying information-bearing signals indicative of computer instructions or data (with or without a carrier wave upon which the signals are modulated). For example, the transmission medium can include a communications network, including but not limited to the Internet, intranet(s), Local Area Networks (LANs), Wide Local Area Networks (WLANs), Storage Area Networks (SANs), Metropolitan Area Networks (MAN) and the like.

The one or more processors 826 can run various software components stored in the medium 810 to perform various functions for the mobile device 802. Note that the order of the modules in the medium 810 does not necessarily denote the order of layers of a software stack as implemented in the medium 810. In some embodiments, the software components include an operating system 811, a communication module (or set of instructions) 812, a touch processing module (or set of instructions) 813, an interface module (or set of instructions) 815, including the mobile register interface 502 of FIG. 5, a rotation detection module (or set of instructions) 816, and one or more applications (or set of instructions) 818. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules can be combined or otherwise rearranged in various embodiments. In some embodiments, the medium 810 can store a subset of the modules and data structures identified above. Furthermore, the medium 810 can store additional modules and data structures not described above. The operating system 811 can include various procedures, sets of instructions, software components and/or drivers for controlling and managing general system tasks (e.g., memory management, storage device control, power management, etc.) and facilitates communication between various hardware and software components. The communication module 812 facilitates communication with other devices using the communications circuitry 850 and includes various software components for handling data received from the RF circuitry 852 and/or the port 854.

The touch processing module 813 includes various software components for performing various tasks associated with touch hardware 834 including but not limited to receiving and processing touch input received from the I/O device 830 via a touch I/O device controller 832. For example, the touch processing module 813 can also include software components for performing tasks associated with other I/O devices (not shown).

The interface module 815 is configured to present and maintain user interfaces of the mobile device 802, such as a merchant interface instance or a consumer interface instance generated by the register module 502. The mobile register interface module 502 can be part of the interface module 815. The interface module 815 can include various known software components for rendering, animating and displaying graphical objects on a display surface. In embodiments, in which the touch hardware 834 is a touch sensitive display (e.g., touch screen), the interface module 815 includes components for rendering, displaying, and animating objects on the touch sensitive display. The interface module 815 can provide animation instructions to an animation engine 842, which can render the graphics including 2-dimensional or 3-dimensional graphics, and provide the rendering to graphics I/O controller 844, so that the graphics I/O controller 844 can display the graphics on display 846. The interface module 815 can further control the audio circuitry 870 to provide an auditory component to the authentication entry interface.

The rotation detection module 816 is configured to detect rotational gestures using the mobile device 802. For example, motion vectors from a motion device controller 884 and orientation vectors from an orientation device controller 894 can be used to determine whether or not a rotational gesture is in progress. The rotation detection module 816 can be the transition detection module 506 of FIG. 5. In a specific example, either rotation of the orientation vectors substantially along a single plane or motion vectors that substantially forms a circular or elliptical curvature can trigger detection of a rotational gesture.

One or more applications 818 can include any applications installed on the mobile device 802, including without limitation, modules of the electronic device 400, a browser, keyboard emulation, widgets, JAVA-enabled applications, encryption, digital rights management, voice recognition, location determination capability (such as that provided by the global positioning system (GPS)), or etc.

The touch I/O controller 832 is coupled to the touch hardware 834, such as the display screen 104 of FIGS. 1A-1F, the display screen 204 of FIGS. 2A-2F, the display screen 304 of FIG. 3, the display screen 404 of FIG. 4, or the touchscreen 504 of FIG. 5, for controlling or performing various functions. The touch hardware 834 communicates with the processing system 820 via the touch I/O device controller 832, which includes various components for processing user touch input (e.g., scanning hardware). One or more other input controllers (not shown) receives/sends electrical signals from/to other I/O devices (not shown). Other I/O devices can include physical buttons, dials, slider switches, sticks, keyboards, touch pads, additional display screens, or any combination thereof.

If embodied as a touch screen, the touch hardware 834 displays visual output to the user in a GUI. The visual output can include text, graphics, video, and any combination thereof. Some or all of the visual output can correspond to user-interface objects. The touch hardware 834 forms a touch-sensitive surface that accepts touch input from the user. The touch hardware 834 and the touch controller 832 (along with any associated modules and/or sets of instructions in the medium 810) detects and tracks touches or near touches (and any movement or release of the touch) on the touch hardware 834 and converts the detected touch input into interaction with graphical objects, such as one or more user-interface objects, or commands to various modules of the mobile device 802, such as the register application module 502. In the case in which the touch hardware 834 and the display 846 are embodied as a touch screen, the user can directly interact with graphical objects that are displayed on the touch screen. Alternatively, in the case in which hardware 834 is embodied as a touch device other than a touch screen (e.g., a touch pad), the user can indirectly interact with graphical objects that are displayed on a separate display screen.

Embodiments in which the touch hardware 834 is a touch screen, the touch screen can use LCD (liquid crystal display) technology, LPD (light emitting polymer display) technology, OLED (organic light emitting diode), or OEL (organic electro luminescence), although other display technologies can be used in other embodiments.

Feedback can be provided by the touch hardware 834 based on the user's touch input as well as a state or states of what is being displayed and/or of the computing system. Feedback can be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

The motion sensor subsystem 880, for example, can be the sensor 510 of FIG. 5. The motion device controller 882 is coupled to a motion hardware 884, such as an accelerometer, a global positioning system (GPS), directional acoustic sensor, or a magnetic direction sensor, for controlling or performing various functions. The motion hardware 884 communicates with the processing system 820 via the motion device controller 882, which includes various components for processing motion vectors detected by the motion sensor subsystem 880.

The motion hardware 884 and the motion device controller 882 (along with any associated modules and/or sets of instructions in the medium 810) can detect and track movements and motion vectors (of the motion hardware 884 and thus the mobile device 802) through the motion hardware 884 and converts the detected movement or motion vector into motion gestures to interact with various modules and functionalities implemented by modules stored on the medium 810 and executed by the one or more processor 826, such as the register application module 502.

The orientation sensor subsystem 890, for example, can be the sensor 510. The orientation sensor controller 892 is coupled to an orientation sensor hardware 894, such as an accelerometer, compass, or a gyroscope, for controlling or performing various functions. The orientation sensor hardware 894 communicates with the processing system 820 via the orientation sensor controller 892, which includes various components for processing orientation vectors as measured by the orientation sensor hardware 894.

The orientation sensor hardware 894 and the orientation sensor controller 892 (along with any associated modules and/or sets of instructions in the medium 810) detects and tracks orientation vectors (of the motion hardware 884 and thus the mobile device 802) through the orientation sensor hardware 894 and determines whether a sequence of the detected orientation vector forms a rotational motion gesture to interact with various modules and functionalities implemented by modules stored on the medium 810 and executed by the one or more processor 826, such as the register application module 502.

In some embodiments, the peripherals interface 824, the one or more processors 826, and the memory controller 822 can be implemented on a single chip. In some other embodiments, they can be implemented on separate chips. The storage 860 can any suitable medium for storing data, including, for example, volatile memory (e.g., cache, RAM), non-volatile memory (e.g., Flash, hard-disk drive), or a both for storing data, including pages used for transition animations.

What is claimed is:

1. A method of operating a mobile device, the method comprising:
  receiving, from a card reader coupled to the mobile device, an indication to initiate a financial transaction between a merchant and a consumer;
  displaying a merchant interface instance of a mobile register interface on a touchscreen of the mobile device for a merchant user to process the financial transaction;
  detecting a flipping over motion of the mobile device by using a sensor mechanically coupled to the mobile device, the flipping over motion causing the touchscreen to change orientation from substantially facing the merchant user of the mobile device to substantially facing away from the merchant user of the mobile device; and
  in response to detecting the flipping over motion, rendering an interface transition visual effect in which a consumer interface instance of the mobile register interface appears to smoothly replace the merchant interface instance in an area of the touchscreen, and said area in which the consumer interface instance replaces the merchant interface instance increases according to a progression of the flipping over motion;
  wherein the consumer interface instance of the mobile register interface is used by the consumer to authorize the financial transaction; and wherein the consumer interface instance and the merchant interface instance are different interactive displays.

2. The method of claim 1, wherein rendering the interface transition visual effect comprises shifting in a portion of the consumer interface instance from a first edge of the touchscreen and shifting out a portion of the merchant interface instance from a second edge of the touchscreen, wherein said shifting is controlled according to the progression of the flipping over motion.

3. The method of claim 1, wherein rendering the interface transition visual effect comprises shrinking the merchant interface instance in height to free up space on the touchscreen to display the consumer interface instance, wherein said shrinking is controlled according to the progression of the flipping over motion.

4. The method of claim 1, wherein further comprising mapping the consumer interface instance and the merchant interface instance to equal and opposite sides of a virtual curved sheet surface; wherein rendering the interface transition visual effect comprises rendering a portion of the virtual curved sheet surface through a virtual camera window moving along a curvature of the virtual curved sheet surface at a constant distance normal to the virtual curved sheet surface; and wherein said moving is controlled according to the progression of the flipping over motion.

5. The method of claim 4, wherein rendering the interface transition visual effect further comprises adjusting the curvature of the virtual curved sheet surface including widening the curvature until a bisector of the virtual camera window aligns with a bisecting plane of the curve sheet surface and sharpening the curvature thereafter.

6. The method of claim 1, wherein the consumer interface instance and the merchant interface instance are visually identical with different orientations with respect to each other.

7. A method of operating a mobile device, the method comprising:
  initiating a transaction on a mobile device;
  displaying a first interface instance of a mobile application on a display screen of the mobile device for a first user to process the transaction;
  detecting a flipping over motion of the mobile device by using a sensor mechanically coupled to the mobile device; and
  in response to detecting the flipping over motion, rendering an interface transition visual effect in which a second interface instance of the mobile application appears to replace the first interface instance in an area of the display screen, and said area in which the second interface instance replaces the first interface instance increases according to a progression of the flipping over motion;

wherein the second interface instance for a second user to authorize the transaction; and wherein the first interface instance and the second interface instance are different interactive displays.

8. The method of claim 7, wherein rendering the interface transition visual effect comprises shifting in a portion of the second interface instance and shifting out a portion of the first interface instance, wherein said shifting is controlled according to the progression of the flipping over motion.

9. The method of claim 7, wherein rendering the interface transition visual effect comprises contracting the first interface instance in height to free up space on the display screen to fit the second interface instance, wherein said contracting is controlled according to the progression of the flipping over motion.

10. The method of claim 7, wherein rendering the interface transition visual effect comprises introducing the second interface instance from a frontier edge of the display screen in a direction of the flipping over motion.

11. The method of claim 7, further comprising generating the first interface instance and the second interface instance of the mobile application on the mobile device.

12. The method of claim 7, wherein the first interface instance and the second interface instance are visually different from each other.

13. The method of claim 7, wherein the first interface instance and the second interface instance are visually identical with different orientations with respect to each other.

14. The method of claim 7, wherein a rotation speed of the flipping over motion controls an animation speed of the interface transition visual effect.

15. The method of claim 7, wherein detecting the flipping over motion comprises detecting a reversal in a rotation direction of the flipping over motion; and wherein rendering the interface transition visual effect comprises reversing the interface transition visual effect in response to the reversal in the rotation direction.

16. The method of claim 7, wherein rendering the interface transition visual effect comprises introducing the second interface instance onto the display screen oriented opposite from an orientation of the first interface instance.

17. The method of claim 7, further comprising mapping the first interface instance and the second interface instance to equal and opposite sides of a virtual sheet surface; wherein rendering the interface transition visual effect comprises rendering a portion of the virtual sheet surface through a virtual camera window moving along the virtual sheet surface at a constant distance normal to the virtual sheet surface; and wherein said moving is controlled according to the progression of the flipping over motion.

18. The method of claim 17, wherein the virtual sheet surface is curved; and wherein said moving of the virtual camera window tracks the flipping over motion including rotating the virtual camera window along a curvature of the virtual sheet surface.

19. The method of claim 18, wherein rendering the interface transition visual effect further comprises adjusting the curvature of the virtual sheet surface including widening the curvature until a bisector of the virtual camera window aligns with a bisecting plane of the virtual sheet surface.

20. The method of claim 8, wherein the portion of the second interface instance is shifted in from a top edge of the display screen and the portion of the first interface instance is shifted out from a bottom edge of the display screen.

21. A mobile device comprising:
a processor configured to initiate a transaction, to generate a first interface instance and a second interface instance and to receive a flipping over motion of the mobile device from a sensor mechanically coupled to the mobile device;
a touchscreen to display at least the first interface instance for a first user to process the transaction; and
wherein the processor is configured to render, in response to the sensor detecting the flipping over motion, an interface transition visual effect on the touchscreen, such that the second interface instance smoothly replaces the first interface instance in an area of the touchscreen, and the area increases according to a rotary progression of the flipping over motion;
wherein the second interface instance is for a second user to authorize the transaction; and wherein the first interface instance and the second interface instance are different interactive displays.

22. The mobile device of claim 21, wherein when the touchscreen displays the interface transition visual effect, a portion of the second interface instance shifts into view and a portion of the first interface instance shifts out of view, wherein a speed of shifting both the first interface instance and the second interface instance is controlled according to a speed of the flipping over motion.

23. The mobile device of claim 21, wherein when the touchscreen displays the interface transition visual effect, the first interface instance contracts in height to free up space on the touchscreen to fit the second interface instance, wherein a speed of contracting the first interface instance is controlled according to a speed of the flipping over motion.

24. The mobile device of claim 21, wherein the processor is further configured to map the first interface instance and the second interface instance to equal and opposite sides of a virtual curved sheet surface; wherein the touchscreen is configured by the processor to display a portion of the virtual curved sheet surface through a virtual camera window moving along a curvature of the virtual curved sheet surface at a constant distance normal to the virtual curved sheet surface; and wherein movement of the virtual camera window is controlled according to the rotary progression of the flipping over motion.

25. The mobile device of claim 24, wherein the processor is further configured to adjust the curvature of the virtual curved sheet surface including widening the curvature until a bisector of the virtual camera window aligns with a bisecting plane of the curve sheet surface and sharpening the curvature thereafter.

26. A method of operating a mobile device, the method comprising:
initiating a transaction on the mobile device;
generating a first interface instance and a second interface instance on the mobile device;
displaying the first interface instance on a display screen of the mobile device for a first user to process the transaction;
detecting a flipping over motion of the mobile device through a sensor mechanically coupled to the mobile device; and
in response to detecting the flipping over motion, rendering an interface transition visual effect such that the second interface instance smoothly replaces the first interface instance in an area of the display screen, and the area changes according to a progression of the flipping over motion;
wherein the second interface instance is for a second user to authorize the transaction;
and wherein the first interface instance and the second interface instance are different interactive displays.

* * * * *